US006190481B1

(12) United States Patent
Iida et al.

(10) Patent No.: US 6,190,481 B1
(45) Date of Patent: Feb. 20, 2001

(54) PRESSURE VESSEL AND PROCESS FOR PRODUCING THE SAME

(75) Inventors: Yasushi Iida; Akihiko Kitano; Masayoshi Yamagiwa; Masanobu Kobayashi; Kenichi Noguchi, all of Ehime (JP)

(73) Assignee: Toray Industries, Inc., Tokyo (JP)

( * ) Notice: Under 35 U.S.C. 154(b), the term of this patent shall be extended for 0 days.

(21) Appl. No.: 08/875,115

(22) PCT Filed: Dec. 4, 1995

(86) PCT No.: PCT/JP95/02472

§ 371 Date: Nov. 20, 1997

§ 102(e) Date: Nov. 20, 1997

(87) PCT Pub. No.: WO97/20683

PCT Pub. Date: Jun. 12, 1997

(51) Int. Cl.[7] ................................................. B65H 81/00
(52) U.S. Cl. ..................... 156/175; 156/153; 156/173; 156/185; 156/188
(58) Field of Search ................................. 220/588–590, 220/414; 156/169, 172, 173, 175

(56) References Cited

U.S. PATENT DOCUMENTS

| | | | |
|---|---|---|---|
| 4,461,515 | * | 7/1984 | Gwynette et al. ............... 152/323 |
| 4,569,710 | * | 2/1986 | Lambot et al. ................... 156/172 |
| 4,699,288 |   | 10/1987 | Mohan . |
| 4,767,017 | * | 8/1988 | Logullo, Sr. et al. ........... 220/414 X |
| 4,925,044 |   | 5/1990 | Hembert . |
| 5,007,343 | * | 4/1991 | Marks ............................... 156/173 X |
| 5,025,943 | * | 6/1991 | Forsman .............................. 220/589 |
| 5,028,478 | * | 7/1991 | Odagiri et al. .................... 428/290 X |
| 5,150,812 | * | 9/1992 | Adams ................................. 220/414 |
| 5,211,306 | * | 5/1993 | Delonge-Immik et al. ..... 220/590 X |
| 5,253,778 |   | 10/1993 | Sirosh . |
| 5,499,739 | * | 3/1996 | Greist, III et al. ............... 220/414 X |

FOREIGN PATENT DOCUMENTS

| | | | |
|---|---|---|---|
| 1139138 | * | 11/1962 | (DE) ..................................... 156/172 |
| 1459445 |   | 12/1976 | (GB) . |
| 2134984 |   | 8/1984 | (GB) . |
| 5-29688 |   | 5/1993 | (JP) . |
| 5-88665 |   | 12/1993 | (JP) . |

OTHER PUBLICATIONS

Rosato, D.V., et al, "Filament Winding: its development, manufacture, applications, and design", John Wiley and Sons, 1964, pp. 193–196.*

"NHTSA Action Will Impact Use of Carbon/Epoxy NGV Tanks," Composites & Adhesives Newsletter, Mar. 1995, abstract only.*

M.B. Kasen "Cryogenic Properties of Filamentary–Reinforced Composites: An Update, " Cryogenics, vol. 21, No. 6, pp. 323–340 (1981).

* cited by examiner

*Primary Examiner*—Jeff H. Aftergut
(74) *Attorney, Agent, or Firm*—Foley & Lardner

(57) ABSTRACT

The pressure vessel of the present invention comprises an inner shell capable of serving as a gas barrier and a pressure resistant outer shell provided to cover the inner shell, said outer shell being made of an FRP comprising reinforcing fibers and a resin and is 35 GPa or more in tensile modulus and 1.5% or more in tensile breaking strain. The present invention can provide a pressure vessel not only light in weight, but also excellent in retaining its internal pressure against repetitive impacts and also excellent in reliability. The process for producing a pressure vessel of the present invention comprises the step of forming a pressure resistant outer shell made of an FRP comprising reinforcing fibers and a resin and is 35 GPa or more in tensile modulus and 1.5% or more in tensile breaking strain, around an inner shell capable of serving as a gas barrier, by a filament winding method or a tape winding method. The present invention can produce a pressure vessel excellent in retaining its internal pressure, excellent in reliability, and light in weight at a low cost.

14 Claims, 15 Drawing Sheets

11a

11b

11c

PRESSURE VESSEL AND PROCESS FOR PRODUCING THE SAME

TECHNICAL FIELD

The present invention relates to a pressure vessel used for various applications, especially pressure vessels suitable for installation in motor vehicles, etc.

BACKGROUND ART

In recent years, motor vehicles using natural gas as a fuel have attracted attention as low-pollution vehicles. Such a motor vehicle is mounted with a pressure vessel generally called a CNG tank (compressed natural gas tank).

The conventional pressure vessels for motor vehicles are made of a metal such as steel or aluminum alloy, but a pressure vessel made of a metal is heavy and shortens the drivable distance of the motor vehicle per unit weight of the fuel supplied to the motor vehicle. In addition, since the calorific value of natural gas per unit weight is only about one half that of gasoline, the quantity of natural gas which must be stored in a motor vehicle must be about double as compared with gasoline, if the drivable distance without additional fuel supply is to be kept as long as that for gasoline. This also increases the total weight of the motor vehicle, to further shorten the drivable distance of the motor vehicle. So, as a means for elongating the drivable distance of a motor vehicle, studies have been made to reduce the weight of the pressure vessel.

Japanese Patent Publication No. 5-88665 discloses a pressure vessel, in which a plastic inner shell capable of serving as a gas barrier is covered with a pressure resistant outer shell made of an FRP (fiber reinforced plastic). Since the pressure vessel is substantially made of plastics materials, it is very light in weight as compared with a metallic pressure vessel, and if it is used as a pressure vessel installed on a motor vehicle to contain natural gas, it can be expected that the drivable distance of the motor vehicle can be extended. However, on the other hand, since an FRP is fragile as compared with a metal, an impact due to a collision or any other cause can cause the pressure vessel to be burst instantaneously, to injure human bodies by its broken pieces or to cause an explosive fire due to leak of natural gas. Furthermore, if the progression of destruction of a car body by a collision is examined, it can often be observed that the same region of the car body receives impacts repetitively with the progression of destruction. So, even if the FRP pressure vessel is not burst by the first impact, the second impact applied to the same region can easily burst the FRP pressure vessel even if the impact energy is relatively low, and the same situation as caused when bursting is caused by one impact is brought about. Thus, the pressure vessel, especially the fuel pressure vessel of a motor vehicle is required not to be burst by one impact, but to be able to sustain its internal pressure even if it receives impacts repetitively. The prevention of bursting and the sustenance of internal pressure can, of course, be achieved if a higher safety factor is adopted. However, a higher safety factor increases the weight, to lose the greatest merit of weight reduction effect provided by the adoption of FRP, and raises the production cost.

Furthermore, U.S. Pat. Nos. 5,253,778 and 4,925,044 disclose a pressure vessel, in which a metallic boss is bonded to the opening of a plastic inner shell by an adhesive, and a pressure vessel, in which the flange of a metallic boss is coupled with and covered by an inner shell of plastics material covered with a pressure resistant FRP outer shell.

These pressure vessels are very light in weight as compared with a metallic pressure vessel, and if used as pressure vessels in motor vehicles, it can be expected that the drivable distance can be extended. However, since the coupling between a metallic boss and an inner shell of plastics material is not achieved by mechanical clamping, any impact applied to the metallic boss or its vicinity can disturb the close contact achieved between the metallic boss and the plastic inner shell, causing the gas in the pressure vessel to leak.

DISCLOSURE OF INVENTION

An object of the present invention is to solve the above mentioned problems of the conventional pressure vessels, and to provide a pressure vessel not only light in weight, but also excellent in maintaining its internal pressure against repetitive impacts and also excellent in reliability.

Another object of the present invention is to present a process for producing the pressure vessel at a low cost.

To achieve the above objects, the present invention provides a pressure vessel, comprising an inner shell capable of serving as a gas barrier and a pressure resistant outer shell provided to cover the inner shell, said outer shell is made of an FRP comprising reinforcing fibers and a resin and of 35 GPa or more in tensile modulus and 1.5% or more in tensile breaking strain.

Furthermore, the present invention provides a process for producing a pressure vessel comprises forming a pressure resistant outer shell made of an FRP comprising reinforcing fibers and a resin and of 35 GPa or more in tensile modulus and 1.5% or more in tensile breaking strain, around an inner shell capable of serving as a gas barrier, by a filament winding method or a tape winding method.

The pressure vessel of the present invention is excellent in maintaining its internal pressure against repetitive impacts, excellent in reliability, and light in weight, because an outer shell made of an FRP comprising reinforcing fibers and a resin and of 35 GPa or more in tensile modulus and 1.5% or more in tensile breaking strain is provided to cover an inner shell capable of serving as a gas barrier. Therefore, the pressure vessel of the present invention is especially suitable as a CNG tank of a motor vehicle required to be light in weight and especially excellent in reliability.

Furthermore, according to the pressure vessel production process of the present invention, a pressure vessel excellent in maintaining its internal pressure, excellent in reliability, and light in weight can be produced at a low cost.

Figure 1:
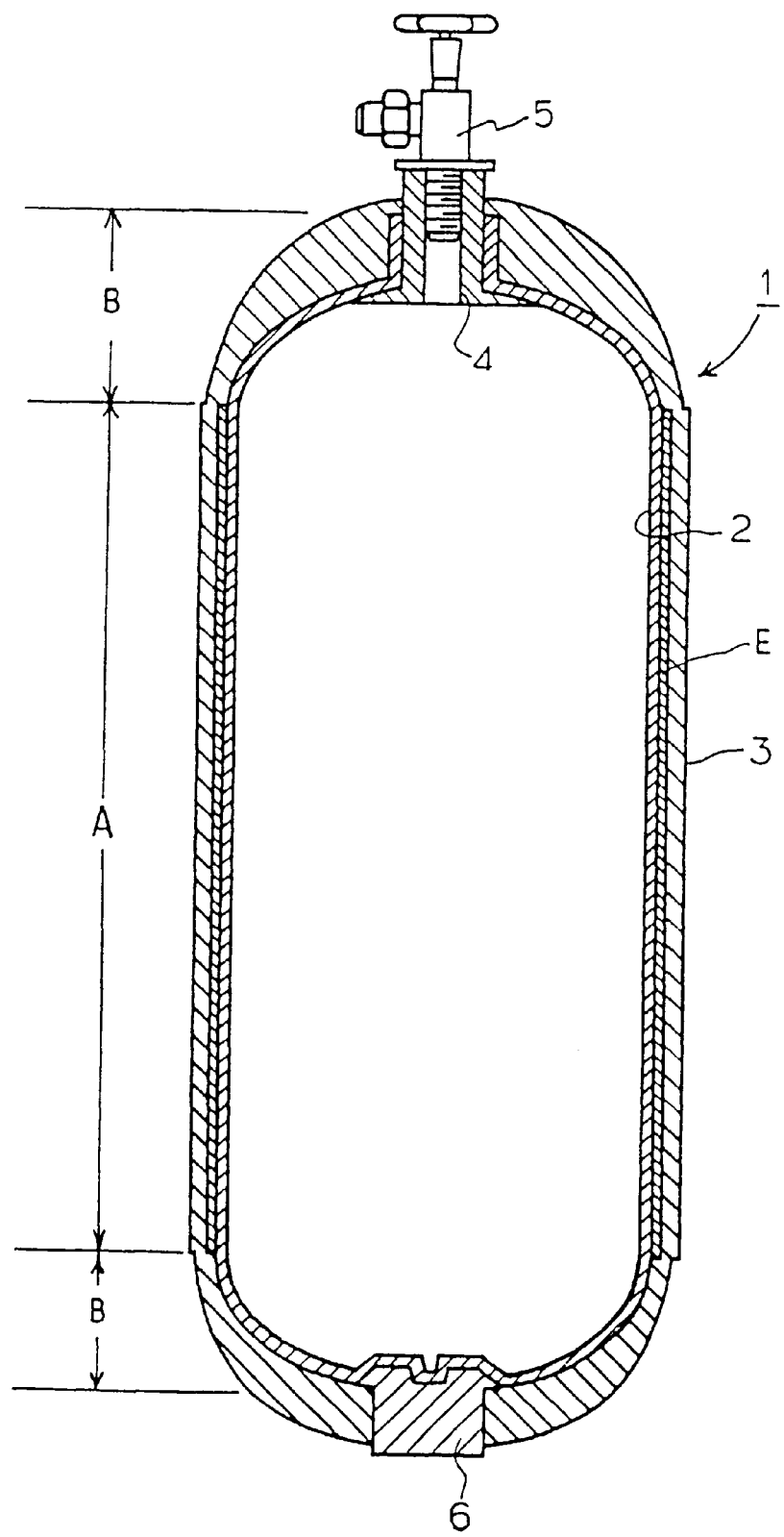
FIG. 1 is a schematic vertical sectional view showing an embodiment of the pressure vessel of the present invention.

The symbols in the drawings stand for the following:
1: pressure vessel, 2: inner shell,
3: outer shell,
4: boss for nozzle installation,
5: nozzle, 6: end boss portion
A: body portion, B: dome-shaped end portion, E: reinforcing layer
101: creel stand, 102: bobbin, 103: reinforcing fiber yarn,
104: reinforcing fiber bundle (before impregnation with resin), 105: guide roll for reinforcing fibers,
106a, 106b, 107a, 107b, 108: separate roll,
109: resin impregnating bath, 110: resin,
111a, 111b, 111c: roller,
112: resin impregnated reinforcing fiber bundle,
113, 113a, 113b, 113c: guide roll,
114, 114a, 114b: feed roller
115: rubber pad for resin wringing, 116: bracket
117: carriage stand, 118: cylinder, 118a: hollow portion
119: inner shell, 119a: axis of rotation of mandrel,
120: rotation drive means, 121: outer shell

BEST MODE FOR CARRYING OUT THE INVENTION

The present invention is described below in detail based on embodiments. In FIG. 1, a pressure vessel 1 has an inner shell capable of serving as a gas barrier and a pressure resistant FRP outer shell 3 provided to cover the inner shell 2. The pressure vessel 1 as a whole has a body portion A, dome-shaped end portions B connected with it, a boss 4 for nozzle installation, a nozzle 5 installed in it, and an end boss portion 6 provided at the other end.

In this configuration, the inner shell functions to prevent gas leakage. Furthermore, as described later, it also acts as a core for forming the heat resistant outer shell.

The inner shell is made of, for example, a thin metal such as a light alloy such as like aluminum alloy or magnesium alloy, or a resin such as polyethylene resin, polypropylene resin, polyamide resin, ABS resin, polybutylene terephthalate resin, polyacetal resin, or polycarbonate resin. For excellent impact resistance, ABS resin is preferable. The inner shell made of a resin can be produced, for example, by blow molding. Furthermore, a multi-layer structure, in which a layer excellent in gas sealability of, for example, a polyamide resin sandwiched between layers excellent in rigidity of, for example, high density polyethylene resin can also be formed by complex blow molding. Moreover, the inner shell can also be made of an FRP. The inner shell made of an FRP can be produced, for example, by injection-molding a resin containing reinforcing fibers, described later, as short as about 2 to 10 mm.

To improve the gas leakage preventing effect of the inner shell, it is also preferable that a gas barrier layer is formed on the inside surface and/or the outside surface. For example, if fluorine-containing nitrogen gas is used as the blow gas at the time of blow molding, a gas barrier layer made of a fluorine resin can be formed on the inside surface of the inner shell. Furthermore, a plating film of a metal such as copper, nickel or chromium can also be formed on the outside surface as a gas barrier layer. The metallic plating film can be formed by electrolytic plating or electroless plating. When the inner shell is produced by complex blow molding, it is also possible to form a layer, capable of serving as an excellent gas barrier, for example, a polyamide resin as an inner layer and to form a layer to allow easy plating of, for example, ABS resin as an outer layer, for easy formation of a metallic plating film.

Furthermore, the inner shell can be provided with annular ribs extending in circumferential direction at about 2.5 to 5 cm intervals on the inside or outside surface. Such an inner shell can be produced by making ribbed inner shell halves of plastics material and joining them for integration. The ribs improve the strength of the inner shell, and prevent the deformation of the inner shell when the outer shell described-later is formed, the ribs also being useful for preventing the decline in the strength of the outer shell, dispersion of strength, and the decline in ability to maintain internal pressure respectively caused by the meandering or uneven existence of reinforcing fibers.

Referring again to FIG. 1, the body portion A of the inner shell has a layer, in which the reinforcing fiber yarns described later are hoop-wound or arranged in any other way, and a reinforcing layer E made of an FRP prepared by compounding a woven fabric, etc. of such reinforcing fiber yarns, and a resin. The reinforcing layer E may extend into the dome-shaped end portions B. However, in the present invention, this reinforcing layer is not necessarily required.

On the other hand, the outer shell 2 is made of an FRP comprising reinforcing fibers and a resin, and has a tensile modulus of 35 GPa ore more and a tensile breaking strain of 1.5% or more. If the outer shell is made of an FRP and has a tensile modulus of 35 GPa or more and a tensile breaking strain of 1.5% or more, the pressure vessel is excellent in its ability to maintain its internal pressure against repetitive impacts, and also excellent in reliability. The tensile modulus is preferably 37 GPa or more, more preferably 40 GPa or more. If the tensile modulus is less than 35 GPa, the deformation caused by an impact is so large as to threaten to damage the inner shell, hence to cause gas leakage, and the outer shell is weak against repetitive impacts. On the other hand, the tensile breaking strain must be at least 1.5%, preferably 1.7% or more, more preferably 2.0% or more. If the tensile breaking strain is less than 1.5%, the reinforcing fibers are remarkably damaged and ruptured by an impact, and when receiving repetitive impacts at the same region, the outer shell may cause gas leakage or be burst even if it may be damaged slightly by the first impact.

The outer shell can be formed, for example, by forming wound layers of reinforcing fiber yarns containing a resin by the known filament winding method or tape winding method with the inner shell as a mandrel.

A specific method of producing the outer shell by the filament winding method is described below as an example. A predetermined number of respective reinforcing fiber yarns 103 unwound from respective bobbins 102 of a creel stand 101 are brought together and formed into a reinforcing fiber bundle 104 which is fed to guide rolls 105. The guide rolls 105 in this example include a pair of free rotating rolls 106a and 106b extending substantially horizontally, a pair of free rotating rolls 107a and 107b extending substantially vertically located downstream of the rolls 106a and 106b, and a free rotating roll 108 extending substantially horizontally. The guide rolls 105 introduce the reinforcing fiber bundle 104 brought together to have an approximately predetermined sectional form, into a resin impregnating bath 109.

Figure 4:
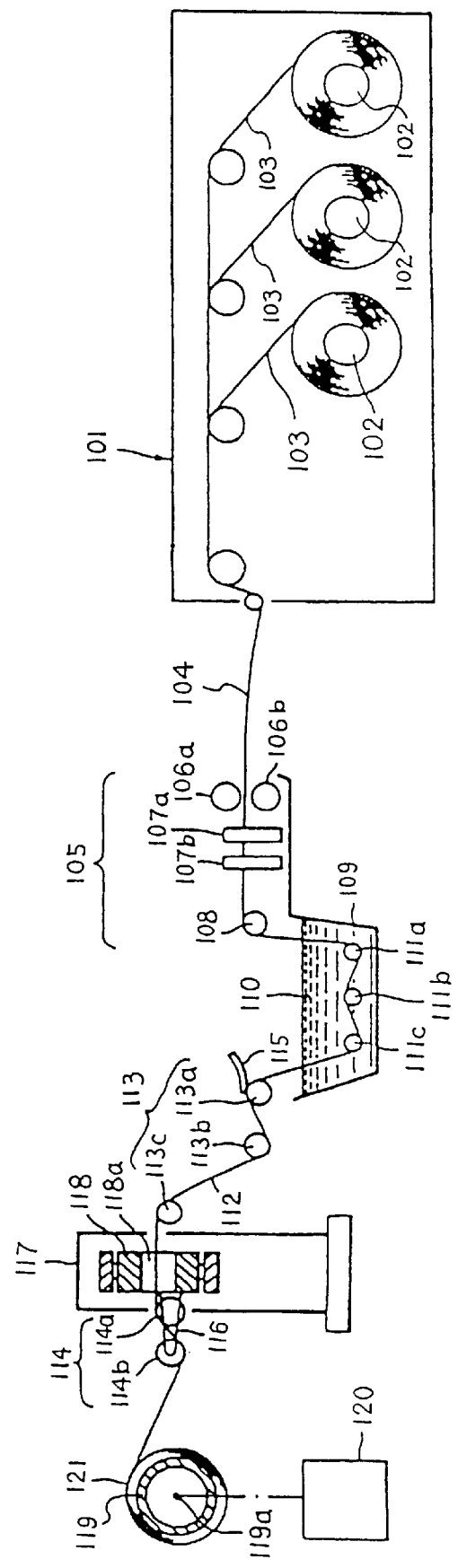
FIG. 4 is a schematic process chart showing an example of the pressure vessel production process of the present invention.

The reinforcing fiber bundle 104 is impregnated with a resin 110 in the resin impregnating bath 109, and then the resin impregnated reinforcing fiber bundle 112 is wound around a rotating inner shell 119 at predetermined angles, to thereby form an outer shell 121. The impregnation of the reinforcing fiber bundle 104 with the resin 110 can be accomplished by the impregnation method as shown in FIG. 4, or by using a touch roll. When a reinforcing layer is provided between the inner shell and the outer shell, it is preferable to form the outside surface of the inner shell to be as rough as about 10 μm to about 200 μm in average height, since the reinforcing fiber yarns wound around it can be prevented from sliding, to lessen the disturbance in the distribution of the reinforcing fibers preferably.

In the filament winding method, usually, a guide means such as guide rollers 113 to guide the resin impregnated reinforcing fiber bundle 112, and feed rollers 114, for winding the resin impregnated reinforcing fiber bundle at predetermined positions on the inner shell at predetermined angles immediately before the inner shell, are provided between the resin impregnating bath 109 and the inner shell 119.

The guide rollers 105 and 113 include rotating rollers and fixed rollers. The guide rollers can be satin-finished rollers, plated rollers or the like. If such rollers used are low in coefficient of friction, the reinforcing fiber bundle is hardly flawed.

Figure 5:
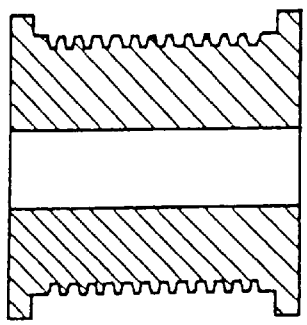
FIG. 5 is a schematic sectional view showing an example of a straight roller used in an example of the pressure vessel production process of the present invention.
Figure 6:
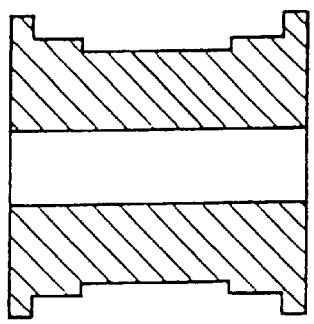
FIG. 6 is a schematic sectional view showing another example of a straight roller used in an example of the pressure vessel production process of the present invention.

The feed rollers are usually straight rollers with collars at both the ends, lest the guided reinforcing fiber bundle should come off from the roller surfaces. To keep the width of the guided reinforcing fiber bundle constant, grooves at certain intervals as shown in FIG. 5, or recesses with certain widths can be formed in the straight rollers.

The formed product thus obtained by laminating the resin impregnated reinforcing fiber bundle 112 on the surface of the inner shell 119 is heated to be hardened for a certain time, depending on the hardening conditions of the resin used. It is preferable to keep the formed product placed horizontally and rotated in the circumferential direction while being hardened, since the irregular hardening of the resin can be lessened.

If the formed product is treated at the final setting temperature in a short time, high heat is generated in the outer shell during hardening, to thereby internally crack the outer shell, or the resin is suddenly squeezed out in a large amount, to thereby form voids in the outer shell. So, it is preferable to control the hardening temperature as described below. Though depending on the resin used, it is generally preferable that, in the initial stage of hardening, long time pre-setting treatment is carried out in a temperature range from 50° C. to 90° C., to gradually squeeze out the resin for decreasing voids while preventing the cracking caused by the heat generation inside the outer shell, and that subsequently the temperature is raised to the final setting temperature, for hardening.

The reinforcing fiber yarns include fiber yarns high in strength and tensile modulus such as carbon fiber yarns, glass fiber yarns, or organic fiber yarns such as polyaramid fiber yarns. These reinforcing fiber yarns are preferably non-twisted fiber yarns excellent in opening property, since they can lessen stress concentration when bent, and lessen the generation of voids. These different kinds of fiber yarn can also be used in combination. Above all, if glass fiber yarns low in tensile modulus and carbon fiber yarns are used in combination, the production cost can be decreased. In this case, the helically wound layers of the outer shell can be formed by glass fiber yarns, and the hoop-wound layers, by carbon fiber yarns. As another method, united yarns consisting of a glass fiber yarn and a carbon fiber yarn can also be impregnated with a resin, to be wound.

Among the reinforcing fiber yarns, carbon fiber yarns of 4.5 GPa or more, preferably 5.5 GPa or more in the strand tensile strength and 2% or more, more preferably 2.2% or more in the strand tensile breaking strain are preferable since they are excellent in specific strength and specific elastic modulus, causing little fiber breaking and fluffing during winding, can enhance productivity, and can prevent the decline of strength and the decline of impact resistance otherwise caused by the joints of fiber yarns and the ingress of fluff. The "tensile strength" refers to the value obtained by measuring according to JIS R 7601, and the "tensile breaking strain" refers to the value obtained by dividing the tensile strength by the strand tensile modulus measured according to JIS R 7601.

It is more preferable to use carbon fiber yarns of 0.30 or less in oxygen ratio at surface (O/C) and 0.02 or more in nitrogen ratio at surface (N/C) in addition to satisfying the above mentioned values of the strand tensile strength and tensile breaking strain. The "oxygen ratio at surface" and the "nitrogen ratio at surface" refer to the values measured by the X-ray photoelectronic spectroscopic analysis described below.

To measure the oxygen ratio at surface (O/C), at first, a carbon fiber bundle remaining after removing the sizing agent, and the like, by a solvent is cut and spread on a sample mount made of stainless steel, and $MgK\alpha_{1,2}$ is used as the X-ray source with the photoelectron exit angle kept at 90 degrees. The sample chamber is kept at a vacuum degree of $1\times10^{-8}$ Torr, and to correct the peak in response to the electrification during measurement, at first, the binding energy of the main peak of $C_{1S}$ is set at 284.6 eV. The $C_{1S}$ peak area is obtained by drawing a straight base line in a range from 282 to 296 eV, and the $O_{1S}$ peak area is obtained by drawing a straight base line in a range from 528 to 540 eV. The oxygen ratio at surface (O/C) is expressed by the ratio of the number of atoms obtained by dividing the ratio between the $O_{1S}$ peak area and the $C_{1S}$ peak area by the sensitivity correction value peculiar to the instrument. The value shown in Example 2 described later was obtained by using ESCA-750 produced by Shimadzu Corp., and the sensitivity correction value peculiar to the instrument was 2.85.

To measure the nitrogen ratio at surface (N/C), at first, a carbon fiber bundle remaining after removing the sizing agent, and the like by a solvent is cut and spread on a sample mount made of stainless steel, and $MgK\alpha_{1,2}$ is used as the X-ray source with the photoelectron exit angle kept at 90 degrees. The sample chamber is kept at a vacuum degree of $1 \times 10^{-8}$ Torr, and to correct the peak in response to the electrification during measurement, at first the binding energy of the main peak of $C_{1S}$ is set at 284.6 eV. The $C_{1S}$ peak area is obtained by drawing a straight base line in a range from 282 to 296 eV, and the $N_{1S}$ peak area is obtained by drawing a straight base line in a range from 398 to 410 eV. The nitrogen ratio at surface (N/C) is expressed as the ratio of number of atoms obtained by dividing the ratio between the $N_{1S}$ peak area and the $C_{1S}$ peak area, by the sensitivity correction value peculiar to the instrument. The value shown in Example 2 described later was obtained by using ESCA-750 produced by Shimadzu Corp., and the sensitivity correction value peculiar to the instrument was 1.7.

Since carbon fiber yarns of 0.30 or less in oxygen ratio at surface and 0.02 or more in nitrogen ratio at surface are more reactive with the resin used in the outer shell, they can enhance the pressure maintained within the outer shell. Therefore, if such carbon fiber yarns are used to form the outer shell, the pressure vessel is light in weight, very excellent in impact resistance, and also excellent in reliability.

The carbon fiber yarns, the oxygen ratio at surface (O/C) and nitrogen ratio at surface (N/C), measured by the above mentioned X-ray photoelectronic spectroscopic analysis, of which are kept in the above ranges, can be obtained by electrolytic oxidation treatment or oxidation treatment in a vapor phase or liquid phase, etc. A production method based on the electrolytic oxidation treatment method is described below.

In this case, the electrolyte can be either an acid or alkaline aqueous solution. The acid aqueous solution can be an aqueous solution of sulfuric acid, nitric acid, hydrochloric acid or the like. The alkaline aqueous solution is preferably an aqueous solution containing ammonium ions, for example, ammonium hydrogencarbonate, ammonium carbonate, tetralkylammonium hydroxide, etc. or any of their mixtures, etc. Especially ammonium hydrogencarbonate and ammonium carbonate are preferable since they can increase the nitrogen ratio at surface N/C.

The coulomb value for the treatment is preferably optimized to suit the degree of carbonization of the carbon fiber yarns to be treated. To prevent the decline in the tensile strength of the substrate of the carbon fiber yarns and to promote the decline in the crystallinity of the surface layer, it is preferable to repeat the electrolytic treatment several times at a low coulomb value. Specifically, the coulomb value per 1 g of carbon fiber yarns per electrolytic cell is preferably 1 [coulomb/g.cell] to 40 [coulombs/g.cell].

As for the energization method, the carbon fiber yarns can be brought into direct contact with an electrode roller, to be energized directly, or can be energized indirectly with an electrolyte provided between the carbon fiber yarns and the electrode. Indirect energization is preferable to obtain a higher tensile strength, since the fluffing, electric sparks, etc. during electrolytic treatment can be inhibited.

After completion of electrolytic treatment, the carbon fiber yarns are preferably washed by water, and dried. In this case, to enhance the affinity, adhesiveness, etc. to the resin described later, it is preferable to dry at a temperature as low as possible, lest the functional groups existing on the outermost surfaces of the carbon fiber yarns should be thermally decomposed, and specifically, it is desirable to dry at a temperature of 250° C. or lower, more preferably 210° C. or lower.

The resin used to form the outer shell of the pressure vessel of the present invention include thermosetting resins such as epoxy resins, unsaturated polyester resins, vinyl ester resins, and phenol resins, and thermoplastic resins such as polyamide resins, polyethylene terephthalate resin, ABS resin, polyether ketone resins, polyphenylene sulfide resin, poly-4-methylpentene-1 resin, and polypropylene resin. Especially to make the impact absorbing energy by deformation larger, it is preferable to use a resin larger in tensile breaking strain, say, preferably 3% or more, more preferably 5% or more in tensile breaking strain.

Meanwhile, the ratio of the tensile tension in the axial direction of the pressure vessel caused by internal pressure to the tensile tension in the circumferential direction is almost 1:2. To achieve a lighter weight, and a higher strength and a higher tensile modulus for maintenance of a higher internal pressure, it is more preferable that the reinforcing fibers of the outer shell form a layer of reinforcing fibers arranged at an angle within a range from 0° to ±15°, preferably 0° to ±5°, a layer of reinforcing fibers arranged at an angle within a range from ±75 to ±105° C., preferably ±85° to ±100° C., and a layer of reinforcing fibers arranged at an angle within a range from ±30° to ±60°, preferably ±40 to ±50° respectively, with reference to the axial direction of the pressure vessel, in this order from inside. Furthermore, it is preferable that the volume ratio of the reinforcing fibers of the layer of reinforcing fibers arranged at an angle within a range from 0° to ±15° to that of the layer of reinforcing fibers arranged at an angle within a range from ±75° to ±105° to that of the layer of reinforcing fibers arranged at an angle within a range from ±30° to ±60° is 1 to 1.5–2.5 to 0.2–1.2. The layers of 0° to ±15° and ±75° to ±105° mainly act to enhance the internal pressure which can be maintained, while the layer of ±30° to ±60° acts to enhance the impact resistance. To ensure a large residual strength after reception of an impact, it is preferable to arrange the layer of ±30° to ±60° as the outermost layer.

Furthermore, to prevent the pressure vessel from bursting when a hole is formed momentarily by an impact, it is preferable that the reinforcing fibers of the outer shell form a layer of reinforcing fibers arranged at an angle within a range from ±5° to ±50°, preferably ±25° to ±40°, and a layer of reinforcing fibers arranged at an angle within a range from ±75° to ±105°, preferably ±85° to ±100° respectively, with reference to the axial direction of the pressure vessel, in this order from inside, in order to improve the in-plane isotropy of the outer shell. Moreover, it is preferable that the volume ratio of the reinforcing fibers of the layer of reinforcing fibers arranged at an angle within a range from ±5° to ±50° to that of the layer of the reinforcing fibers arranged at an angle within a range from ±75° to ±105° is within a range of 1.0 to 1.0–2.0.

It is preferable that the borders between the body portion and the dome-shaped end portions are slightly thicker, since the bending stress by internal pressure acts there. Furthermore, if an FRP layer consisting of a mat or non-woven fabric of the above mentioned reinforcing fibers and a resin is formed between the respective layers, or a similar FRP layer is formed as the outermost layer, impact energy can be dispersed to further enhance the impact resistance. Similarly the outermost layer can be formed as an FRP layer consisting of glass fibers or organic fibers excellent in impact resistance and a resin, or as a resin layer made of polyethylene resin, polyamide resin, or urethane resin, etc.

The gas which can be contained in the pressure vessel of the present invention is not especially limited, and can be the above mentioned natural gas, nitrogen, oxygen, helium gas or the like.

In the pressure vessel of the present invention, if the outer shell comprises a layer structure consisting of 5 layers or more at the body portion of the pressure vessel, and the relation between the total thickness T (mm) of all the layers and the number N of layers is kept in a range of $0.5 \leq T/N \leq 6$, the internal pressure which can be maintained by the body portion and the strength against the impact force from outside can be significantly enhanced. In the body portion, it is more preferable that hoop-wound layers of reinforcing fibers and helically wound layers of reinforcing fibers are arranged alternately in the thickness direction of the outer shell.

Such a pressure vessel can be produced by forming a pressure resistant FRP outer shell around an inner shell capable of serving as a gas barrier by the filament winding method, so that the outer shell may have a layer structure of 5 layers or more at the body portion of the pressure vessel, and that the relation between the total thickness T (mm) of all the layers and the number N of layers may be kept in a range from $0.5 \leq T/N \leq 6$.

In this production method, when the outer shell is formed, for example, by the filament winding method, it is preferable to use a non-twisted reinforcing fiber bundle of 5 or more in D/t, where D is the width of the bundle not yet impregnated with the resin, and t is the thickness of the bundle, as reinforcing fibers.

Figure 2:
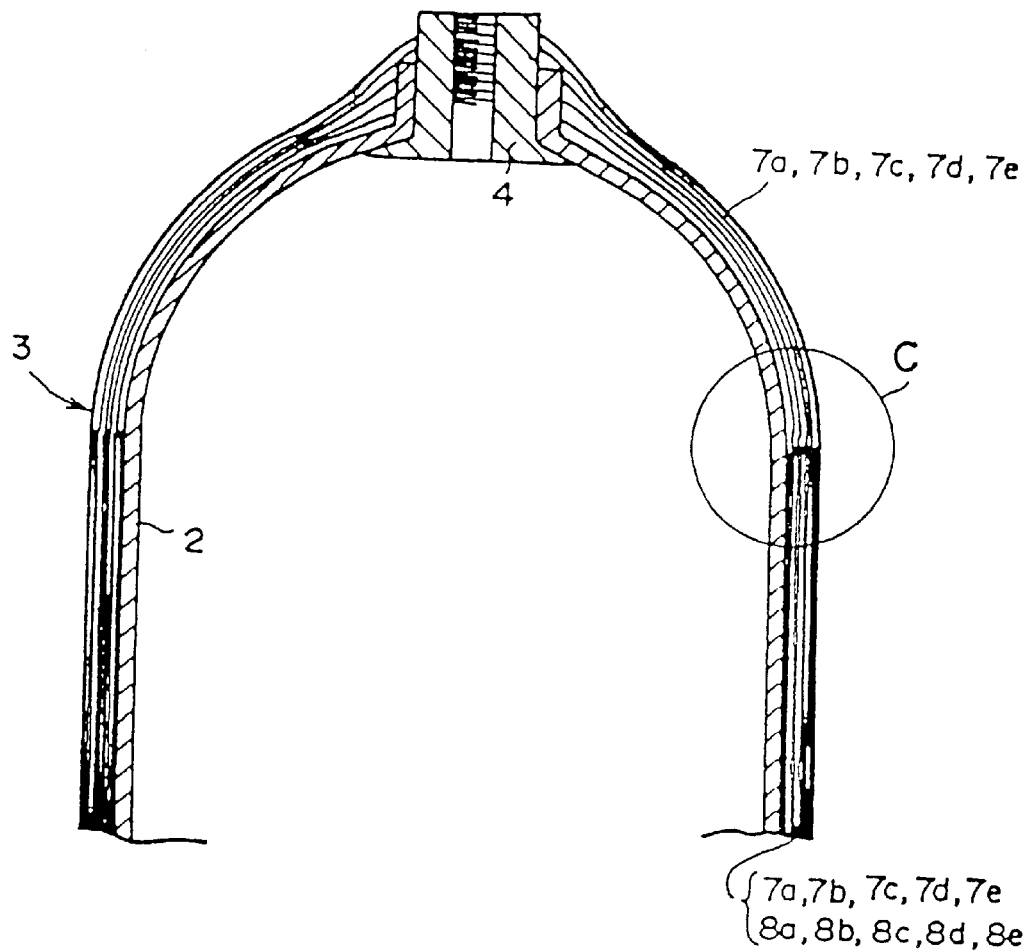
FIG. 2 is a partial vertical sectional view showing another embodiment of the pressure vessel of the present invention.
Figure 3:
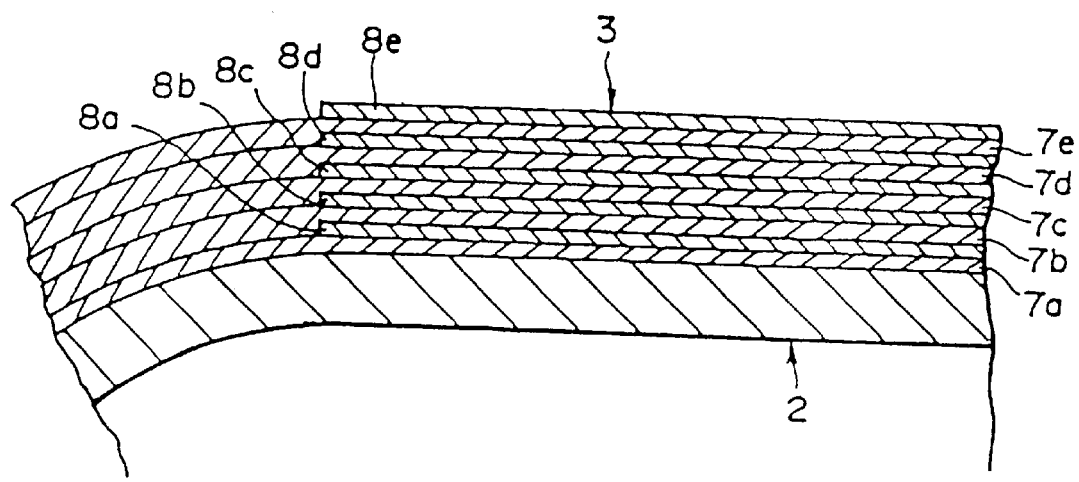
FIG. 3 is an enlarged longitudinal sectional view showing the portion C of the pressure vessel of FIG. 2.

In the pressure vessel of this embodiment, the FRP outer shell 3 is formed as shown in FIGS. 2 and 3. That is, the outer shell 3 is formed to have a layer structure of 5 layers or more at the body portion. In this embodiment, the outer shell 3 consists of 10 layers in total at the body portion. The respective layers are basically distinguished since the respectively adjacent layers are different in the angle of arranged reinforcing fibers. In this case, each layer with a ± angle range, for example, each of the layers with a fiber arranged angle range of ±30°, ±45°, ±75°, or ±85° is considered as one layer with ±θ.

The dome-shaped end portions of the outer shell 3 have 5 layers in this embodiment, but do not necessarily have a layer structure consisting of 5 or more layers. It is only required that the body portion has a layer structure consisting of 5 or more layers.

At the body portion of the outer shell 3, as the innermost layer, a layer 7a formed by helically winding reinforcing fibers is arranged, and on it, a layer 8a formed by hoop-winding reinforcing fibers is arranged. Also arranged alternately on it are layers 7b, 7c, 7d and 7e formed by helically winding reinforcing fibers, and layers 8b, 8c, 8d and 8e formed by hoop-winding reinforcing fibers. In the arrangement of respective layers, it is also possible that the innermost layer is a layer formed by hoop-winding reinforcing fibers, that a layer formed by helically winding reinforcing fibers is arranged on it, and that layers formed by hoop-winding reinforcing fibers and layers formed by helically winding reinforcing fibers are arranged alternately on them sequentially.

A hoop-wound layer has the reinforcing fibers wound substantially in the circumferential direction, and functions as a hoop-wound layer not only at 90° but also. in a range from about ±75° to about ±105°, with the axial direction of the cylinder as 0°. A helically wound layer refers to a wound layer other than the hoop-wound layer.

In this embodiment, as shown in FIG. 3, the respective hoop-wound layers 8a to 8e extend to the ends of the body portion of the outer shell 3, and the dome-shaped end portions of the outer shell 3 are formed by the helically wound layers 7a to 7e extended from the body portion. The hoop-wound layers 8a to 8e can also be extended to the dome-shaped end portions.

This embodiment satisfies the relation of $0.5 \leq T/N \leq 6$, where T is the total thickness (mm) of all the layers of the body portion of the outer shell 3, and N is the total number of layers 7a to 7e and 8a to 8e forming the outer shell 3 at the body portion. In this case, the thicknesses of the respective layers can be decreased to decrease the total thickness of the outer shell 3, and a multi-layer structure consisting of 5 layers or more can be secured.

When the outer shell 3 has such a multi-layer structure especially at the body portion, the following functions and effects can be obtained.

First of all, when a large outside impact force acts, any damage, if caused even partially, can be localized in the outermost layer 8e or also in the layers close to it, to protect the inner layers, and no fatal damage as a whole occurs. That is, a multi-layer structure disperses the stress caused by a locally applied impact load, to prevent the inner layers from being damaged. Since the dispersion of the stress also acts to absorb the impact energy in addition to preventing the damage of the inner layers, the damage of the outermost layer itself can also be decreased, compared to a case of using one layer only or a layer structure consisting of a few layers.

Especially when many separate hoop-wound layers 8a to 8e are arranged as in this embodiment, inter-layer cracks are less liable to occur, and the strength against impacts from outside can be very high.

Furthermore, the multi-layer structure contributes to a higher fiber content by volume and less voids in the entire outer shell 3. For example, when the outer shell 3 is formed by the filament winding method, the respective layers wound and laminated sequentially tighten the layers respectively formed immediately before them, to squeeze out the resin of the respectively laminated layers for increasing the fiber content by volume, and for extruding voids, to lessen voids. The higher fiber content by volume and less voids greatly improve the strength of the outer shell 3 as a whole, and also remarkably improve the quality.

Figure 7:
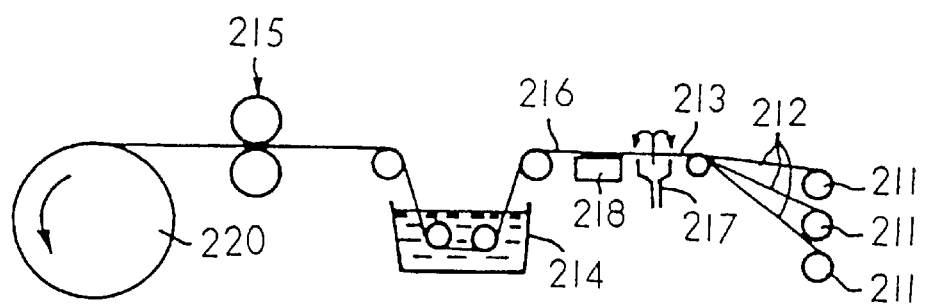
FIG. 7 is a schematic process chart showing another example of the pressure vessel production process of the present invention.

The outer shell 3 consisting of 5 or more layers and of 0.5 to 6 in T/N can be formed, for example, by a method as illustrated in FIG. 7.

FIG. 7 shows a method, in which an outer shell is formed on a pre-molded inner shell by the filament winding method.

The reinforcing fibers yarns 212 (e.g., carbon fiber yarns) unwound from respective creels 211 are brought together as a reinforcing fiber bundle 213 which is impregnated with a resin in a resin bath 214, and then flattened by a pair of pressure rolls 215, then wound around an inner shell 220. By controlling the winding angle, hoop-wound layers and helically wound layers are alternately formed.

Figure 8:
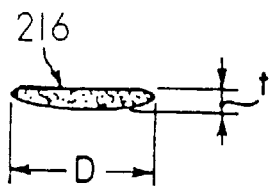
FIG. 8 is a sectional view showing an example of a reinforcing fiber bundle.

The outer shell must have a multi-layer structure consisting of thin layers as described before, and the thin layers specified in the present invention can be formed, for example as shown in FIG. 8, by using a non-twisted reinforcing fiber bundle 216 (e.g., non-twisted carbon fiber bundle) of 5 or more in D/t, where D is the width of the bundle not yet impregnated with the resin, and t is the thickness of the bundle. To promote the flattening, the reinforcing fiber bundle is preferably excellent in opening property, and the excellent opening property can be obtained, for example, according to the method described in Japanese Patent Publication No. 5-29688, i.e., by letting the reinforcing fiber bundle contain a sizing agent having a polyglycidyl ether, cyclic resin polyepoxide or their mixture as an essential ingredient, and satisfying the above condition of D/t. The sizing agent can be applied, for example, by a sizing agent applying means 217 shown in FIG. 7, and dried and fixed by a drying means such as a hot plate 218, hot roll or hot air drying chamber.

The reinforcing fiber bundle 216 in conformity with these conditions is impregnated with a resin, and flattened into a predetermined form by the pressure rolls 215, then wound around the inner shell 220, to form a multi-layer structure of the present invention.

In this method, since, in essence, the existing filament winder can be used by adding very simple apparatuses such as a sizing agent applicator and pressure rolls 215, the desired multi-layer structure of the outer shell can be obtained very easily at a low cost.

Moreover, in the pressure vessel of the present invention, if the outer shell comprises a reinforcing fiber bundle [X], a thermosetting resin [Y], and an elastomer and/or thermoplastic resin [Z], as components, with the component [Z] localized around the component [X] appearing in a sectional face of the outer shell, then the outer shell can be tough with high pressure resistance maintained, and can prevent a crack or any damage of reinforcing fibers from propagating, to be enhanced in impact resistance and fatigue resistance.

The pressure vessel of this embodiment can be produced by forming its outer shell, using a yarn prepreg containing the components [X], [Y] and [Z], having the component [X] impregnated with the component [Y], and having the component [Z] existing near the surface.

Figure 9:
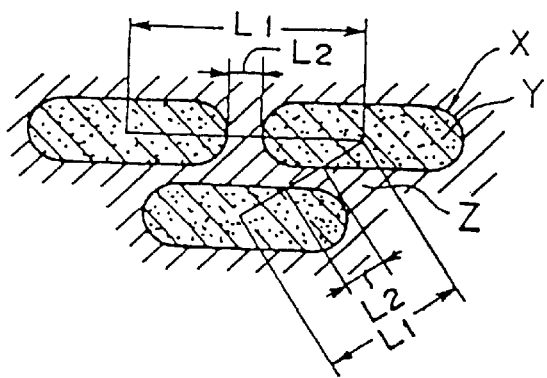
FIG. 9 is a partial sectional view at a cross sectional face of an outer shell in yet another embodiment of the pressure vessel of the present invention.

In this embodiment, the outer shell is composed of the components [X], [Y] and [Z], as shown in FIG. 9.

The number of filaments constituting the reinforcing fiber bundle as the component [X] is preferably 1,000 to 500,000, more preferably 3,000 to 50,000. To obtain a thicker fiber bundle, a plurality of fiber bundles can be combined, and on the contrary, to obtain a thin fiber bundle, a thick fiber bundle can be divided.

The thermosetting resin as the component [Y] can be in particular an epoxy resin, and it is generally used in combination with a hardening agent and hardening catalyst. Especially an epoxy resin with an amine, phenol or a compound with a carbon-carbon double bond as the precursor is preferable. The epoxy resin with an amine as the precursor can be selected from various isomers of tetraglycidyl diaminodiphenylmethane, triglycidyl-p-aminophenol triglycidyl-m-aminophenol and triglycidyl aminocresol. The epoxy resin with a phenol as the precursor can be selected from bisphenol A type epoxy resins, bisphenol F type epoxy resins, bisphenol S type epoxy resins, phenol novolak type epoxy resins and cresol novolak type epoxy resins. The epoxy resin with a compound with a carbon-carbon double bond as the precursor can be selected from alicyclic epoxy resins. The epoxy resin usable in the present invention is not limited to the above. A brominated epoxy resin obtained by brominating any of these epoxy resins can also be used.

The hardening agent can be selected from acid anhydrides (Methyl Nadic anhydride, etc.), amine based hardening agents (metaphenylenediamine, methyldianiline, ethylmethylimidazole, isophoronediamine, etc.), polyaminoamide based hardening agents, phenol based hardening agents (bisparahydroxyphenylsulfone, etc.), polymercaptan based hardening agents, and latent hardening agents (dicyandiamide, etc.). Any of these hardening agents can also be used in combination with a hardening catalyst such as boron trifluoride amine complex or an imidazole compound. Furthermore, a urea compound obtained by the addition reaction of an isocyanate and dimethylamine can also be used together.

The component [Y] can be preferably selected from maleimide resin, resins having acetylene terminals, resins having Nadic acid terminals, resins having cyanate terminals, resins having vinyl terminals and resins having allyl terminals. Any of these resins can also be mixed with an epoxy resin or any other resin. Furthermore, it is also allowed to use a reactive diluent, or a modifier such as a thermoplastic resin or elastomer as far as the heat resistance is not greatly lowered.

Moreover, the component [Y] can also be a thermosetting resin widely recognized in industry, such as a phenol resin, resorcinol resin, unsaturated polyester resin or vinyl ester resin.

The component [Z] is an elastomer and/or thermoplastic resin.

The thermoplastic resin is typically a thermoplastic resin having bonds selected from carbon-carbon bonds, amide bonds, imide bonds, ester bonds, ether bonds, carbonate bonds, urethane bonds, thioether bonds, sulfone bonds, imidazole bonds and carbonyl bonds in the main chain. Especially polyvinyl acetate, polyamides, polycarbonates, polyacetals, polyphenylene oxide, polyphenylene sulfide, polyallylates, polyesters, polyamidimides, polyimides, polyether imides, polysulfones, polyether sulfones, polyether ether ketone, polyaramid, polybenzimidazole, polyethylene, polypropylene, cellulose acetate and cellulose butyrate are suitable as thermoplastics resins used in the present invention, since they are excellent in impact resistance. Among them, polyamides, polyimides, polyamidimides, polyether imides, polyether sulfones and polysulfones are especially preferable in the present invention, since they are high in toughness and good in heat resistance. Among them, polyamides are most preferable in the present invention, since they are especially excellent in toughness.

The elastomer can be selected from various elastomers such as synthetic rubbers, and especially a thermoplastic elastomer can be preferably used in the present invention. The thermoplastic elastomer can be selected, for example, from polystyrene based, polyolefin based polyester based and polyamide based thermoplastic elastomers.

If an epoxy resin is used as the component [Y], a polyester based or polyamide based thermoplastic elastomer can be suitably used to assure sufficiently strong bonding between the components [Y] and [Z], for providing a composite material not separated between both even if any stress is generated, since it is high in solubility in the epoxy resin, even though a polystyrene based or polyolefin based thermoplastic elastomer is low in solubility in the epoxy resin.

The polyester based or polyamide based thermoplastic elastomer is a block copolymer type thermoplastic elastomer consisting of a hard segment component with a polyester or polyamide structure and a soft segment component.

In this embodiment, the components [X], [Y] and [Z] appear in the sectional face of the outer shell, for example, as shown in FIG. 9.

That is, around the component [X] comprising the reinforcing fiber bundle integrated with the components [Y], the component [Z] is localized, and between the respectively adjacent reinforcing fiber bundles, a portion consisting of a resin only and substantially not containing any reinforcing fibers appears clearly.

In this sectional face, it is preferable that the following relation is satisfied:

$$1/100 \leq L_2/L_1 \leq 1/2$$

more preferably $$1/50 \leq L_2/L_1 \leq 1/4$$

where $L_1$ is the length of a straight line connecting the geometrical centers of the two adjacent reinforcing fiber bundles, and $L_2$ is the length of a portion of the said straight line crossing the component [Z], i.e., the portion crossing the component substantially consisting of a resin only present between the two adjacent reinforcing fiber bundles.

If $L_2/L_1$ is smaller than 1/100, the propagation of a crack cannot be prevented, and if larger than 1/2, the quantity of the resin is so large as to increase the weight of the pressure vessel.

In FIG. 9, the component [X] is formed to be integrally molded with the component [Y], i.e., a hardened thermosetting resin, and around the integrally molded portions, the component [Z], i.e., a portion consisting of a resin only is clearly present.

In this sectional structure, since the portion of the component [Z] is made of a resin mainly composed of an elastomer and/or thermoplastic resin, it is higher in toughness than the integrally molded portion consisting of the components [X] and [Y]. Therefore, the propagation of a crack or any damage of reinforcing fibers can be cut off at the portion, to be prevented from spreading. As a result, the decline in the pressure resistance and strength of the outer shell by cracking or any damage of reinforcing fibers can be inhibited, and the outer shell as a whole can maintain excellent pressure resistance and strength.

Since the above highly tough portion itself has excellent impact energy absorbability, the impact resistance of the outer shell, and hence the impact resistance of the pressure vessel, is remarkably enhanced.

Furthermore, even if the outer shell is subjected to impact repetitively even at the same region, the progression into fatal damage does not occur since the propagation and expansion of any damage of reinforcing fibers or a crack is prevented.

The outer shell 3 of the pressure vessel as described above can be formed by winding a yarn prepreg containing the components [X], [Y] and [Z], having the component [X] impregnated with the component [Y], and having the component [Z] present near the surfaces, around a pre-molded gas barrier inner shell capable of serving as a gas barrier, for example by the filament winding method. In this case, the component [Y] is not yet solidified.

In the yarn prepreg, the component [Z] is preferably particles of any of the materials as enumerated before.

The form of the particles is not limited to be spherical. The particles can of course be spherical, but can also be of any of various forms in any of various conditions such as a fine powder obtained by grinding resin lumps, or fine particles obtained by spray drying or re-precipitation. Furthermore, milled fibers, needle-like particles, and whiskers can also be used without any problem. Especially when spherical particles are used, those obtained by suspension polymerization can be used directly.

The particle size means an average particle size based on the volume obtained by the centrifugal settling velocity method, etc.

The particle size of the particles suitable for the present invention is 2 $\mu$m to 150 $\mu$m, more preferably 5 $\mu$m to 100 $\mu$m. If the particle size is smaller than 2 $\mu$m, the particles attempted to be arranged around the reinforcing fiber bundle can go into the clearances between the respective single fibers of the reinforcing fibers together with the component [Y], and it can happen that the particles do not exist locally in the surfaces of the yarn prepreg. On the other hand, if the particle size of the particles is 2 $\mu$m or more, the particles are kept out of the clearances between the respective single fibers of the reinforcing fibers when the reinforcing fiber bundle is impregnated with the matrix resin containing the particles. That is, since the particles are filtered away by the reinforcing fibers, they exist locally on the surfaces of the yarn prepreg.

If the particles are very anisotropic in form such as milled fibers, needle-like, and whiskers, they are very less liable to penetrate into the clearances among the filaments and tend to remain at the surfaces of the yarn prepreg, even if they are small in particle size. If particles smaller than 2 $\mu$m in particle size are mixed with the component [Y], to be swollen by the component [Y], being apparently larger in particle size, the above concept of particle size applies to the apparent particle size.

If the particles are larger than 150 $\mu$m in particle size, they may disturb the arrangement of reinforcing fibers, and widen the gaps between respective fiber bundles and the intervals between respective layers more than necessary in the FRP outer shell obtained by molding, to impair the physical properties of the FRP outer shell. However, particles larger than 150 $\mu$m in particle size may be partially dissolved into the component [Y], to be smaller in particle size during molding, or may be deformed by heating during molding, depending on the material of the particles, to narrow the intervals between respective filaments and between respective layers in the FRP outer shell, and in this case, such large particles can be suitably used.

The optimum value of particle size depends on the outer diameter of the fiber of reinforcing fibers, the number of filaments, etc.

The component [Z] can also be provided as fibers. The fibers can be either long or short. The "long fibers" mean fibers of 5 cm or more in length, and the "short fibers" mean fibers of less than 5 cm in length. If the component [Z] is fibers, the thickness of the fiber is preferably 15 deniers or less, more preferably 5 deniers or less, since if the thickness is too large, the gaps between respective fiber bundles and the portions between respective layers where no fiber bundle exists may become thicker unnecessarily, or the arrangement of the fiber bundle may be disturbed, to impair the physical properties of the molded product.

If the component [Z] is fibers, it is preferable to maintain the crystallinity of the fibers at 40% or more by an operation such as drawing. If the crystallinity is too low, the wet heat resistance may be lowered.

The component [Z] may hold its original form or lose it after completion of molding.

The yarn prepreg in this embodiment is preferably flat in section in a plane perpendicular to the longitudinal direction, and in this case, the sectional structure as shown in FIG. 9 can be easily obtained. Furthermore, an outer shell smaller in thickness suitable for the requirement of lighter weight can be easily formed. In the sectional form of the flatness, the length of the longer side is preferably 2 mm to 50 mm.

In the outer shell of the pressure vessel of this embodiment, it is preferable that the component [Z] is localized in the matrix resin around a group of the components [X]. If this condition is not satisfied, for example, if the component [Z] exists in a large quantity deep inside the component [X], the energy absorption in the boundary region may be insufficient, to lessen the effect of improving the impact resistance and fracture toughness of the FRP used to form the outer shell, and the arrangement of reinforcing fibers may be disturbed, to lower the proportion of the matrix resin near the reinforcing fibers, resulting in the decline of strength and heat resistance.

From the above viewpoints, as for the distribution of the component [Z] in the yarn prepreg before molding, it is preferable that most of the component [Z] is distributed near the surfaces of the yarn prepreg. If the outer shell is formed from such a yarn prepreg, the component [Z] is localized in the boundary region between respectively adjacent yarn prepreg, and hence the FRP obtained can be excellent in impact resistance. That the component [Z] is distributed near the surfaces means that at least 90% of the component [Z] exists in regions from the circumferential surfaces of a yarn prepreg to 30% of the minimum thickness of the yarn prepreg. If at least 90% of the component [Z] is present in regions from the circumferential surfaces of a yarn prepreg to about 20% of the minimum thickness of the yarn prepreg, the effects of the present invention appear more remarkably more preferably.

Figure 10:
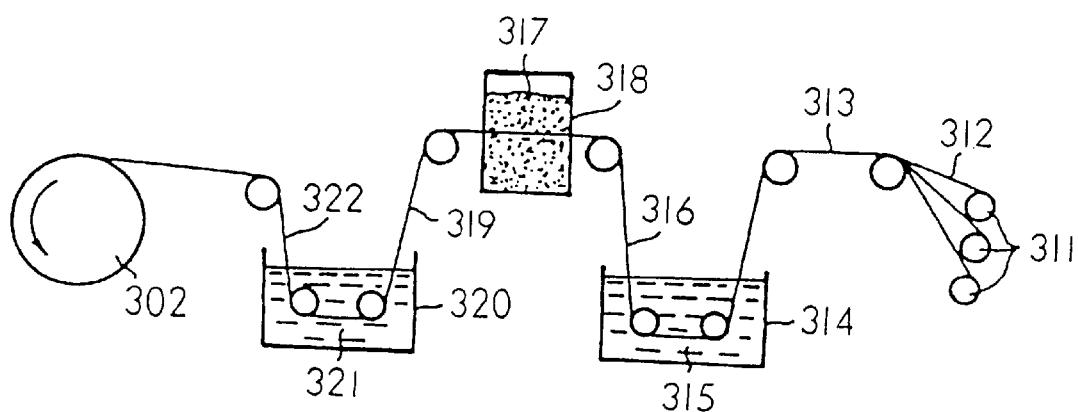
FIG. 10 is a schematic process chart showing yet another example of the pressure vessel production process of the present invention.

The outer shell formed by using such a yarn prepreg, to form the pressure vessel of the present invention is molded, for example, according to the method shown in FIG. 10.

In the method shown in FIG. 10, the reinforcing fiber yarns 312 unwound from a plurality of creels 311 are brought together as a reinforcing fiber bundle 313 which is fed to travel through a resin bath 314, to be impregnated with a matrix resin 315 of a thermosetting resin. The resin impregnated reinforcing fiber bundle 316 is fed to travel through a tank 318 packed with a particle-like or a powdery component [Z] 317, to have the component [Z] 317 deposited mainly near the surfaces of the resin impregnated reinforcing fiber bundle 316. Furthermore, the reinforcing fiber bundle 319 with the component [Z] 317 deposited is fed to travel through a second resin bath 320, to have a matrix resin 321 of a thermosetting resin deposited on the surfaces or to be impregnated with it from the surfaces. The second resin bath 320 is not necessarily required.

The resin impregnated reinforcing fiber bundle 322 with the component [Z] deposited near the surfaces discharged from the second resin bath 320 is wound around an inner shell 2 at a predetermined winding angle by the filament winding method, to form an outer shell 302. After completion of winding, the resin is heated to be hardened, to form the desired outer shell 302.

This production method can be effected substantially simply adding an applicator of the component [Z] to the conventional filament winding equipment, since the second resin bath 320 is not necessarily required, and the intended outer shell excellent in pressure resistance can be easily formed at a low cost.

Moreover, the pressure vessel of the present invention can be sufficiently high in the pressure resistance at the shoulder portions, when the innermost layer at the shoulder portions of the outer shell is a layer formed by hoop-winding reinforcing fibers.

The pressure vessel can be produced by arranging a reinforcing layer comprising reinforcing fibers and a resin having a hoop-wound reinforcing fiber layer, around the shoulder portions of an inner shell capable of serving as a gas barrier, and forming a pressure resistant FRP outer shell around the reinforcing layer and the inner shell.

In the pressure vessel of this embodiment, at the shoulder portions of the outer shell, a hoop-wound reinforcing fiber layer functioning as a reinforcing layer is provided as the innermost layer. The innermost layer as a reinforcing layer can be formed by a filament winding method, or by arranging a unidirectional prepreg. When the innermost layer is formed by the filament winding method, if the circumferential surface of the inner shell at the shoulder portions is formed to have steps in the axial direction, respectively extending in the circumferential direction, the reinforcing fiber yarn or resin impregnated reinforcing fiber yarn wound in the circumferential direction can be prevented from sliding.

Figure 11:
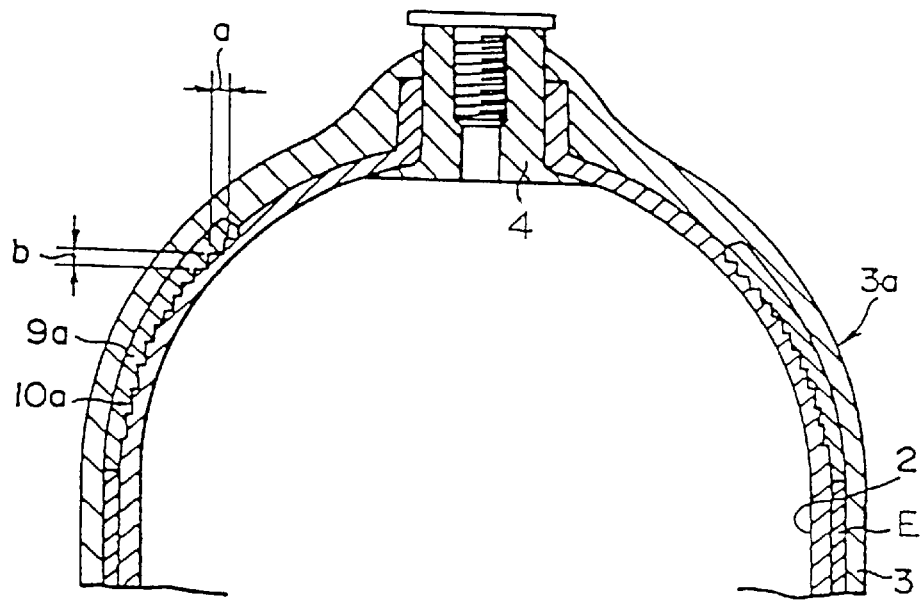
FIG. 11 is a partial vertical sectional view showing the shoulders at one end in a still further embodiment of the pressure vessel of the present invention.

As shown in FIG. 11, the innermost layer 9a at the shoulder portions 3a of the outer shell 3 is formed as a layer having hoop-wound reinforcing fibers. In this embodiment, the innermost layer 9a is an FRP layer formed by the filament winding method. In this embodiment, since a reinforcing layer E is provided around the body portion of the inner shell 2, the innermost layer 9a begins from the ends of the reinforcing layer E and extends up to halfway in the dome-shaped end portion B. The innermost layer 9a formed by hoop winding can be formed as an extended layer when the reinforcing layer E is formed by the filament winding method, or can be formed independently. The innermost layer 9a also acts as a reinforcing layer at the shoulder portions, i.e., to give high tension in the circumferential direction, functioning as a reinforcing layer capable of giving high pressure resistance against the inner pressure in the radial direction.

In this embodiment, on the circumferential surface of the inner shell 2 at the shoulder portions, steps 10a are formed in the axial direction respectively extending in the circumferential direction. The steps 10a can be formed at positions corresponding to the innermost layer 9a. As for the height a and the width b of each step, it is suitable that a is about 0.5 to about 2 mm, and that b is about 1 to about 5 mm.

If the steps 10a are formed, the reinforcing fiber yarn or resin impregnated reinforcing fiber yam can be prevented from sliding when the innermost layer 9a is formed by the filament winding method, and the desired hoop-wound layer can be accurately formed at the desired position. On the innermost layer 9a, the portions other than the innermost layer 9a of the outer shell 3 are formed. It is desirable that the outer shell 3 is also made of an FRP.

Figure 12:
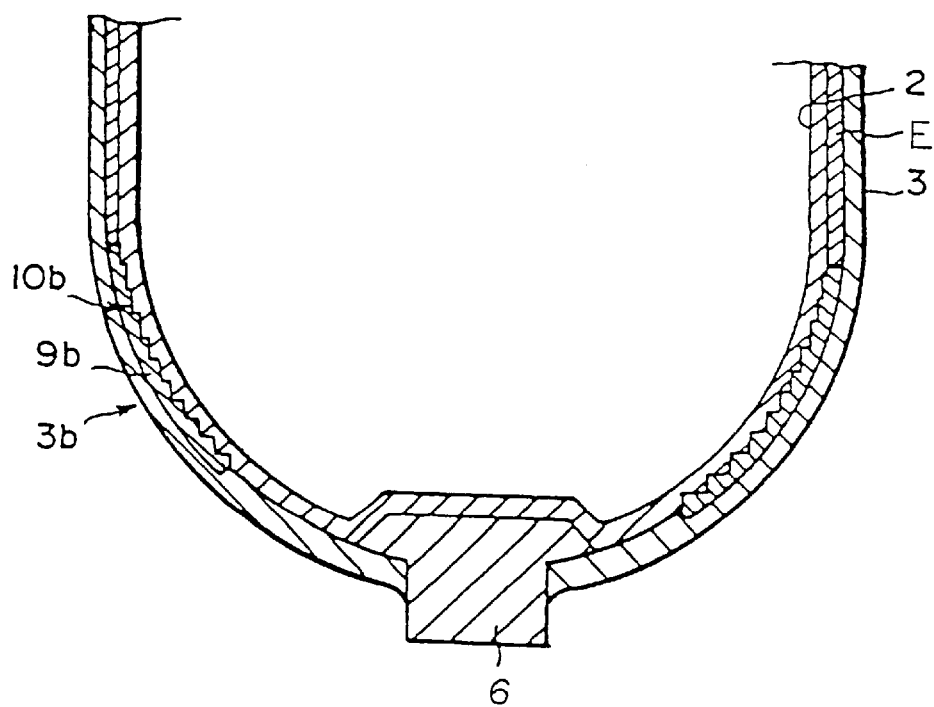
FIG. 12 is a partial vertical sectional view showing the shoulders at the other end in the still further embodiment of the pressure vessel of the present invention.

In this embodiment, the shoulder portions 3b of the end boss portion 6 side are composed substantially in the same way. As shown in FIG. 12, a layer 9b having hoopwound reinforcing fibers is formed as the innermost layer of the outer shell 3, and on it, the other portions of the outer shell 3 are formed. At the shoulder portions of the inner shell 2, the same steps 10b as above are formed.

In the pressure vessel production method of this embodiment, for example, if the inner shell 2 is of plastics material, first of all, when the inner shell 2 is molded by blow molding, the inner shell 2 and the boss 6 are integrally molded. After the inner shell 2 is molded, the pressure resistant outer shell 3 is formed to cover the inner shell 2. At first, the innermost layers 9a and 9b as the reinforcing layer at the shoulder portions are formed, as required, together with the reinforcing layer E of the body portion. The innermost layers 9a and 9b can be formed by a filament winding method or a tape winding method with the inner shell 2 as the core, i.e., as the mandrel. Especially when the filament winding method is used, the steps 10a and 10b formed on the circumferential surface of the inner shell 2 at the shoulder portions prevent the reinforcing fiber yarn or resin impregnated reinforcing fiber yarn wound around the inner shell 2 from sliding.

After the innermost layers 9a and 9b are formed, the remaining portions of the outer shell 3 are formed. If the outer shell 3 is composed of an FRP, the remaining portions can also be formed by a filament winding method or a tape winding method.

Since the outer shell 3 formed in this manner has a layer having reinforcing fibers hoop-wound, as the innermost layer, it can give high tension in the circumferential direction efficiently even at the shoulder portions, and effectively enhances the pressure resistance against the inner pressure in the radial direction.

Figure 13:
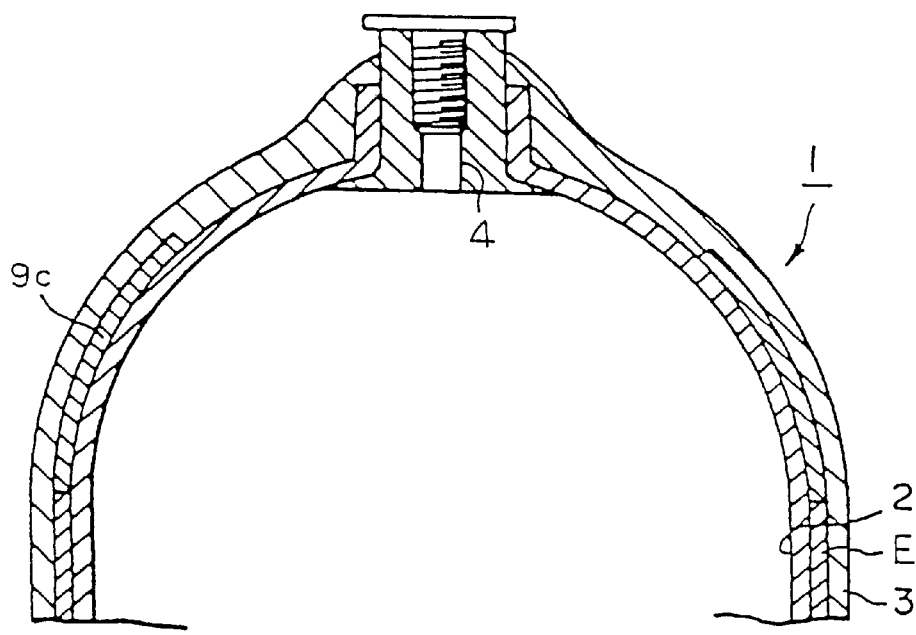
FIG. 13 is a partial vertical sectional view showing the shoulders at one end in another embodiment of the pressure vessel of the present invention.

FIG. 13 shows another embodiment. FIG. 13 shows the shoulder portions of the boss 4 side only, but the same structure is adopted also for the shoulder portions of the end boss portion 6 side. In this embodiment, the innermost layer 9c of the outer shell 3 at the shoulder portions is formed by a unidirectional prepreg. That is, the unidirectional prepreg is arranged at the predetermined positions of the shoulder portions with the reinforcing fiber yarn arranged in the circumferential direction, and is temporarily fixed, and on it, the remaining portions of the outer shell 3 are formed. Since the unidirectional prepreg arranged is a pre-molded sheet, the steps at the shoulder portions of the inner shell as shown in FIGS. 11 and 12 are not necessarily required. Also in this configuration, since the innermost layer 9c is a layer having reinforcing fibers hoop-wound, the pressure resistance against the inner pressure in the radial direction at the shoulder portions of the outer shell, and hence at the shoulder portions of the pressure vessel, can be effectively enhanced. Furthermore, since it is only required to arrange pre-molded unidirectional prepregs at the predetermined positions, the outer shell 3 as a whole can be formed very easily.

Furthermore, the pressure vessel of the present invention can have such a configuration that the inner shell comprises a boss for nozzle installation provided inside its neck portion, that a seal ring is fitted around the boss for nozzle installation on the end face of the neck portion, and that a pressing means is provided to press the seal ring toward the end face of the neck portion. In this case, the gas sealability at the joint between the inner shell and the boss for nozzle installation can be sufficiently enhanced.

This pressure vessel can be produced by joining the inner shell capable of serving as a gas barrier and the boss for nozzle installation, fitting the seal ring around the boss on the end face of the neck portion of the inner shell before forming the pressure resistant outer shell around the inner shell, and installing the pressing means for pressing the seal ring toward the end face of the neck portion, to resiliently deform the seal ring by the pressing means, thereby keeping the deformed seal ring in close contact at least with the end face of the neck portion and the circumferential surface of the boss.

Figure 14:
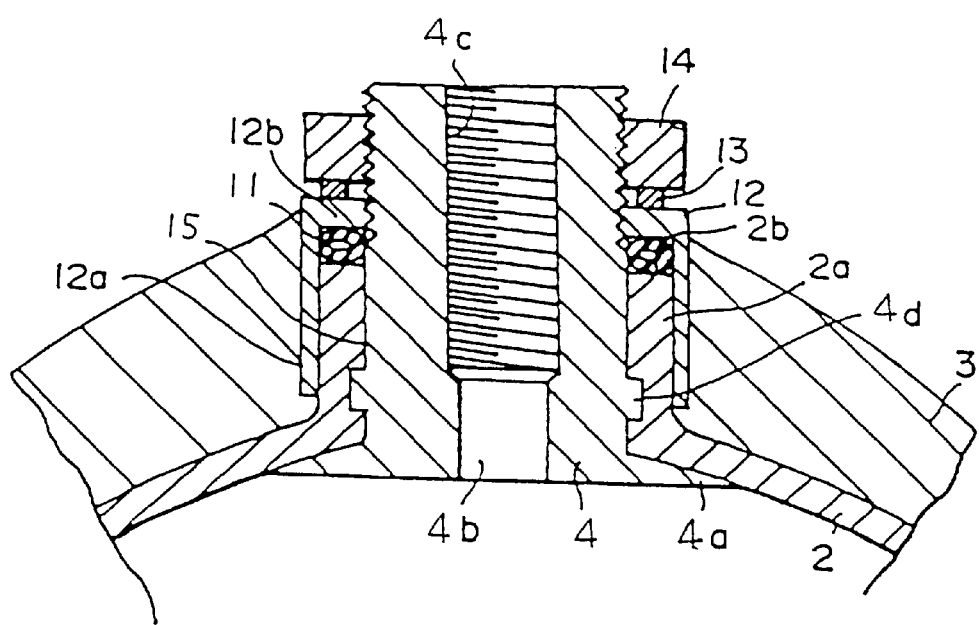
FIGS. 14, 16, 17, 22, and 28 through 35 are partial vertical sectional views showing various bosses and their surrounding portions in still other embodiments of the pressure vessel of the present invention.

In this embodiment, as shown in FIG. 14, the boss 4 has an engaging portion 4a spread like a trumpet at the bottom in the axial direction, and the neck portion 2a of the inner shell 2 extends from the engaging portion 4a to the circumference of the boss 4. The inside surface of the inner shell 2 at the region including the neck portion 2a and the circumferential surface of the boss 4 are integrally joined. If the boss 4 is made of, for example, a metal and the inner shell 2 is made of, for example, a plastics material, then the boss 4 and the inner shell 2 can be integrally joined when the inner shell 2 is molded by blow molding. Inside the boss 4, a thread 4c to be threadedly engaged with a nozzle is formed together with a gas passage 4b, and on the circumferential surface of the boss 4, an annularly extending ridge 4d is formed.

The coupling interface 15 between the boss 4 and the inner shell 2, in more detail, the coupling interface between the circumferential surface of the engaging portion 4a of the boss 4 and the inside surface of the inner shell 2, and the coupling interface between the circumferential surface of the body portion of the boss 4 and the inside surface of the neck portion 2a of the inner shell 2; already has a very high gas sealability because the interfaces are formed by integrally joining the respective surfaces. However, if sealability against a gas as high as about 200 kg/cm$^2$ in pressure is required as in the case of a CNG tank to be installed in a motor vehicle, the internal gas may leak from the coupling interfaces.

In this embodiment, the gas leakage from these portions is effectively prevented.

On the end face of the inner shell 2, or more accurately, on the end face (top end face) 2b of the neck portion 2a of the inner shell 2, and around the circumferential surface of the boss 4, an annular seal ring 11 capable of being resiliently deformed by pressure is arranged. The material of the seal ring 11 can be selected, for example, from natural rubber, synthetic rubbers such as silicone rubber and fluorine rubber, and resins such as tetrafluoroethylene, polyamides, polyethylene and polyesters. A metal such as stainless steel, aluminum, copper and titanium can also be used.

Figure 18:
FIGS. 18 through 20 are partial sectional views showing examples of the sectional form of a seal ring.
Figure 19:
Figure 20:

The sectional form (the sectional form in the thickness direction) of the seal ring 11 can be a solid circle as shown in FIG. 18, a hollow circle as shown in FIG. 19, or a flat plate as shown in FIG. 20, etc. In the embodiment shown in FIG. 14, an O ring made of a synthetic rubber with a sectional form of a hollow circle shown in FIG. 19 is used as the seal ring 11.

Adjacently to the seal ring 11, a pressing member 12 as a member of the pressing means to press the seal ring 11 toward the end face 2b of the inner shell 2 is arranged. In this embodiment, the pressing member 12 consists of a cylindrical portion 12a located outside the seal ring 11 in the radial direction, extending along and fitting the circumferential surface of the neck portion 2a of the inner shell 2, and a collar portion 12b to directly press the seal ring 11.

On the top face of the collar portion 12b of the pressing member 12, an intermediate piece 13 is provided, and on it, a clamp 14 (e.g., a clamping nut) threadedly engaged with the circumferential surface of the boss 4 is provided to be tightened for moving the pressing member 12 through the intermediate piece 13 in a direction such as to press the seal ring. The intermediate piece 13 can have sealability against the ingress of any foreign matter from outside and against gas leakage from inside.

In the gas seal mechanism as described above, for example, if the inner shell 2 is made of a plastics material and the boss 4 is made of a metal, then the inner shell 2 to be molded and the boss 4 can be integrally joined when the inner shell 2 is molded by blow molding, to achieve predetermined sealability before the outer shell is formed.

On the end face 2b of the inner shell 2 and around the circumferential surface of the boss 4, the seal ring 11 is arranged, and is covered with the pressing member 12. Then, the intermediate piece 13 is arranged, and the clamp 14 is tightened, to press the seal ring 11 through the intermediate piece 13 and the collar portion 12b of the pressing member 12, to resiliently deform the seal ring 11. The resilient deformation caused by pressing keeps the seal ring 11 in close contact with the end face 2b of the inner shell 2 and the bottom face of the collar portion 12b of the pressing member 12. In addition to the sealing achieved between these faces and the seal ring 11, the seal ring 11 is deformed also in the radial direction, to be kept in close contact with the circumferential surface of the boss 4, to achieve sealing between the circumferential surface and the seal ring 11. After completion of predetermined clamping, the outer shell 3 made of an FRP is formed up to a position to cover the circumferential surface of the pressing member 12 by the known filament winding method or tape winding method.

In this sealing design, even if the gas in the vessel leaks through the coupling interface 15, the leaking gas flows in a direction such as to pass through the clearance between the seal ring 11 and the end face 2b of the inner shell 2 and in a direction such as to pass through the clearance between the seal ring 11 and the circumferential surface of the boss 4. However, since these regions are sealed as described above, gas leakage can be substantially perfectly prevented.

Since the gas seal acts especially effectively in the clearance between the seal ring 11 and the end face 2b of the inner shell 2 and in the clearance between the seal ring 11 and the circumferential surface of the boss 4, the pressing member 12 can also be an annular flat plate without the cylindrical portion 12a. However, from the viewpoint of controlling the deformation of the seal ring 10 outwardly in the radial direction, for further intensifying the sealing force between the seal ring 11 and the circumferential surface of the boss 4, and from the viewpoint of powerfully fixing the pressing member by the outer shell 3 after the formation of the outer shell 3, it is preferable that the pressing member 12 has a cylindrical portion 12a as in this embodiment.

Figure 21:
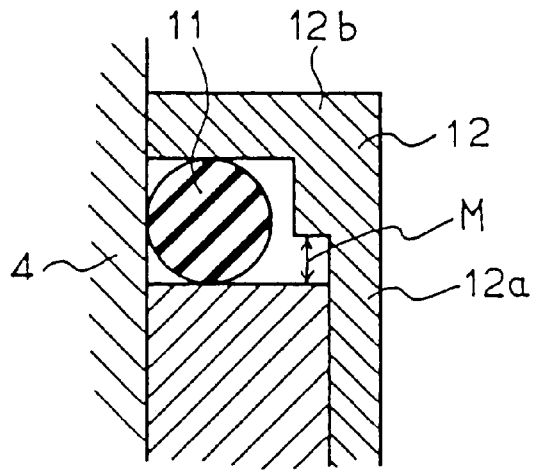
FIG. 21 is an enlarged partial vertical sectional view of the pressure vessel as another example of a modification of the structure shown in FIG. 14.

If the cylindrical portion 12a has a step as shown in FIG. 21, the seal ring can be easily and reliably secured at the required crushed depth M when the pressing member 12 is installed by the clamp 14.

Figure 15:
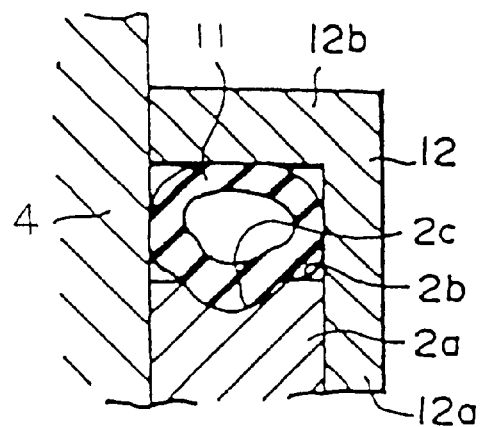
FIG. 15 is an enlarged partial vertical sectional view of the pressure vessel as an example of a modification of the structure shown in FIG. 14.

To further enhance the sealing strength at the seal faces, for example as shown in FIG. 15, an annular groove 2c can also be formed on the end face 2b of the neck portion 2a of the inner shell 2, so that the pressed and deformed seal ring 11 may fit in the groove 2c. Such an annular groove can also be formed on the bottom face of the collar portion 12b of the pressing member 12. The sectional form of the groove as shown in FIG. 15 is not especially limited, but for intensifying the sealability, a circular groove as shown in FIG. 15 is suitable.

Figure 16:
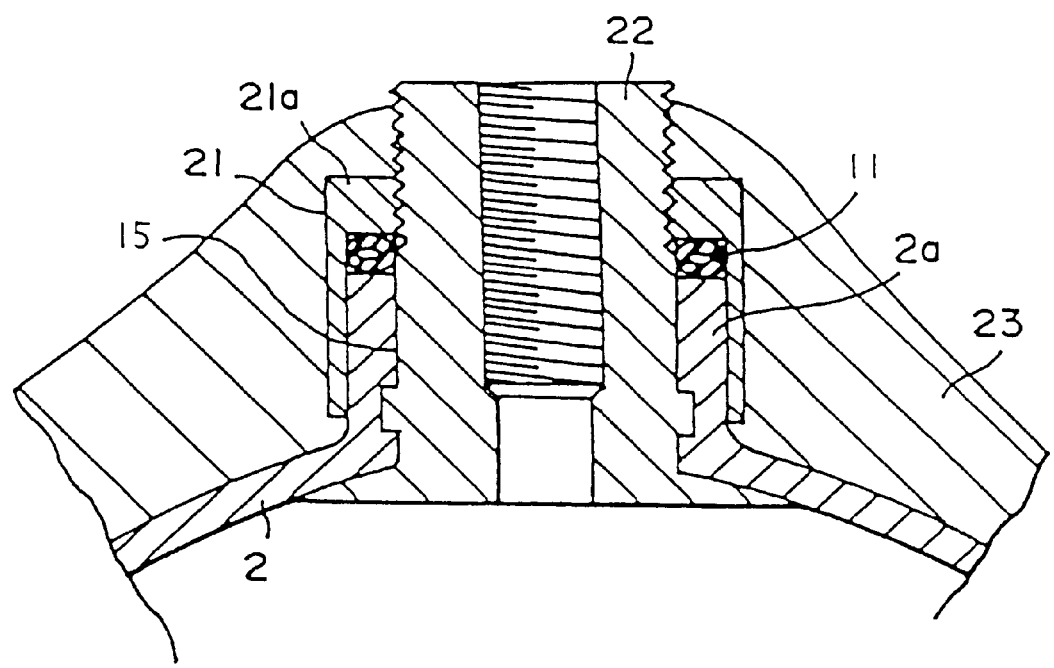
Figure 17:
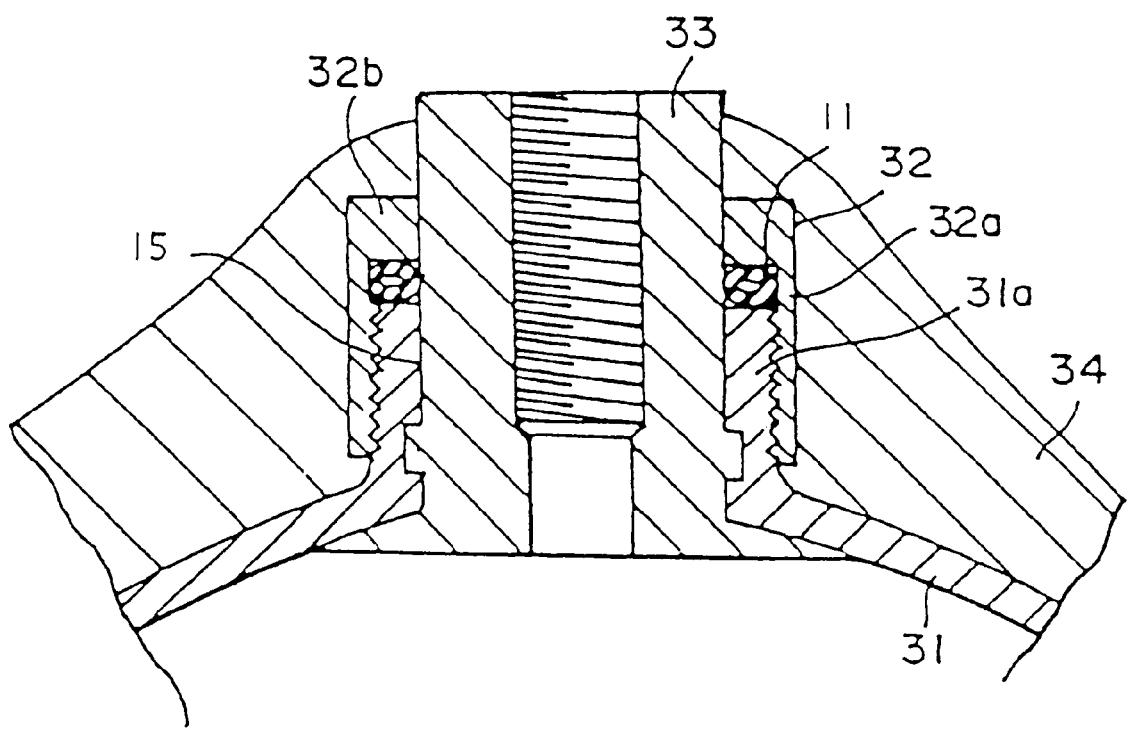

FIGS. 16 and 17 show other embodiments of the gas seal structure at the joint between the inner shell and the boss in the pressure vessel of the above embodiment.

In the embodiment shown in FIG. 16, the clamp 14 shown in FIG. 14 is not used, and a thread is formed on the inside face of the collar portion 21a of the pressing member 21, so that the pressing member 21 may be directly threadedly engaged with the thread provided around the circumferential surface of the boss 22, to allow clamping. Also in this configuration, the seal ring 11 can be pressed and resiliently deformed as in the structure shown in FIG. 14, and the gas leaking from the coupling interface 15 between the inner shell 2 and the boss 22 is perfectly prevented from leaking outside.

In the embodiment shown in FIG. 16, it is preferable that the outer shell 23 is formed to cover the pressing member 21 entirely. This can further intensify the strength to fix the pressing member 21, and can also perfectly prevent the pressing member 21 from turning.

In the embodiment shown in FIG. 17, a thread is formed around the circumferential surface of the neck portion 31a of the inner shell 31, and a thread is formed also on the inside surface of the cylindrical portion 32a of the pressing member 32, so that the pressing member 32 may be threadedly engaged with the circumferential surface of the neck portion 31a, for clamping. The seal ring 11 is pressed and resiliently deformed between the collar portion 32b of the pressing member 32 and the end face of the neck portion 31a of the inner shell 31. Also in this configuration, the gas leaking through the coupling interface 15 between the inner shell 31 and the boss 33 is perfectly prevented by the pressed and deformed seal ring 11 from leaking outside. Also in this case, it is preferable that the outer shell 34 is formed to cover the pressing member 32 entirely.

The gas sealability at the coupling interface between the inner shell and the boss is kept sufficiently high by the sealing mechanism using the seal ring of this embodiment. However, if higher safety is required to be secured, an adhesive can be applied between the respective surfaces, for example, between the inside surface of the pressing member and the circumferential surface of the boss of the inner shell, and between the seal ring and the faces to receive the pressed seal ring, to enhance the sealability. The adhesive can be selected, for example, from epoxy based, acrylic, polyurethane based, polyester based, and other thermosetting adhesives, and above all, reactive acrylic anaerobic adhesives are preferable. The anaerobic adhesives include polyether type and ester type. A typical polyether type anaerobic adhesive is tetraethylene glycol dimethacrylate, and typical ester type anaerobic adhesives are trimethylolpropane trimethacrylate, butanediol 1,4-dimethacrylate, 2,2,4-trimethyl-1,3-pentanediol dimethacrylate, polyester acrylates, etc.

Moreover, if the pressure vessel of the present invention has such a configuration that a boss for nozzle installation is provided inside the neck portion of the inner shell, and that the surface of the boss for nozzle installation, to be coupled with the neck portion is of a rugged configuration, the gas sealability at the coupling interface between the inner shell and the boss for nozzle installation can be kept sufficiently high.

In addition, even if the pressure vessel of the present invention has such a configuration that a boss for nozzle installation is provided inside the neck portion of the inner shell, and that a ridge extending in the circumferential direction is formed on the surface of the boss for nozzle installation, to be coupled with the neck, the gas sealability at the coupling interface between the inner shell and the boss for nozzle installation can be kept sufficiently high.

This pressure vessel can be produced, for example, by integrally joining the neck portion of the inner shell capable of serving as a gas barrier, with the circumferential surface of the boss for nozzle installation with said ruggedness and/or ridge around it, when the inner shell is molded, and rotating the molded inner shell around the boss coupled with the neck portion, to form the pressure resistant outer shell covering the inner shell.

Figure 22:
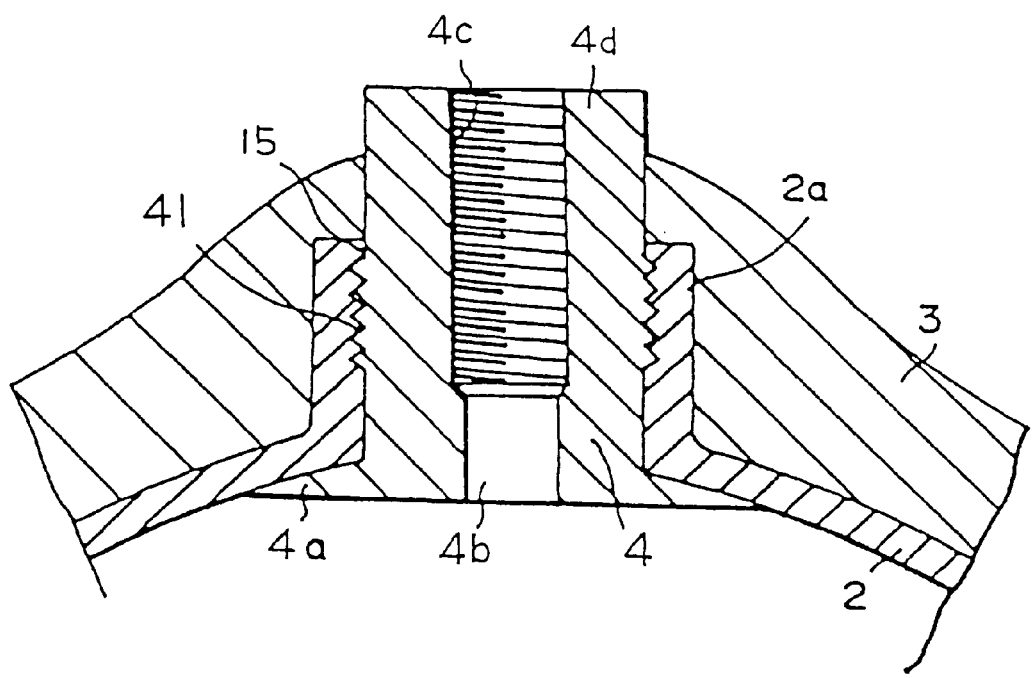

In this embodiment, as shown in FIG. 22, the boss 4 has an engaging portion 4a spread like a trumpet at the bottom in the axial direction, and the neck portion 2a of the inner shell 2 extends up to the circumference of the cylindrical portion 4d from the engaging portion 4a of the boss 4. The inside surface of the region including the neck portion 2a of the inner shell 2 and the circumferential surface of the boss 4 are integrally joined. If the boss 4 is made of, for example, a metal and the inner shell 2 is made of, for example, a plastics material, then the boss 4 and the inner shell 2 can be integrally joined when the inner shell 2 is molded by blow molding. Inside the boss 4, a thread 4c to be threadedly engaged with the nozzle is formed together with a gas passage 4b. The material of the boss 4 is not especially limited, but is preferably a metal in view of the threaded engagement with the nozzle 7, and can be selected, for example, from iron, aluminum, stainless steel and titanium.

The circumferential surface of the boss 4 has a rugged configuration 41 formed entirely around the cylindrical portion 4d of the boss 4 at the coupling interface 15 with the inner shell 2, in more detail, the inside surface of the neck portion 2a of the inner shell 2. The rugged configuration 41 is formed almost over the entire length of the cylindrical portion 4d of the boss 4 in the axial direction of the cylindrical portion 4d, except for small portions at both the ends.

Figure 23:
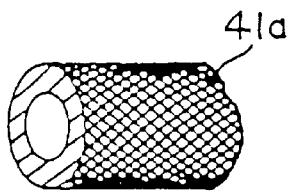
FIGS. 23 through 27 are partial perspective views showing various examples of the rugged structure of the boss shown in FIG. 22.

The rugged configuration 41 in this embodiment is formed by knurling 41a as shown in FIG. 23. The rugged configuration is not limited to knurling, and it is only required that the ruggedness is formed at least in the circumferential direction around the cylindrical portion 4d of the boss, and it is preferable that the ruggedness is formed also in the direction along the axial center. Therefore, rugged configuration 41b with many grooves or ridges extending in the direction along the axial center as shown in FIG. 24, rugged configuration 41c with a plurality of splines extending in the direction along the axial direction as shown in FIG. 25, rugged configuration 41d with many protrusions almost flat at their tips as shown in FIG. 26, rugged configuration 41e with many crests round at their tips as shown in FIG. 27, etc. can be adopted.

If such a rugged configuration 41 is formed, especially when a relative torsional torque acts between the boss 4 and the inner shell 2, high resistance is generated to prevent relative rotation between them. That is, when such a torque acts, loosening of the boss 4 against the inner shell 2 in the circumferential direction can be reliably prevented.

Figure 26:
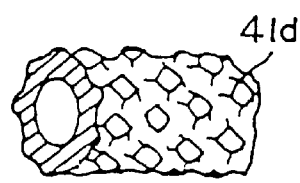
Figure 27:
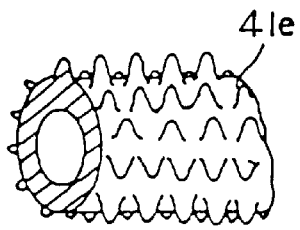

Furthermore, if the rugged configuration 41 is as shown in FIG. 23, 26 or 27, high resistance against the thrust force in the direction along the axial center of the boss 4 can also be given in addition to the high resistance against the torque. So, even if an axial external force acts on the boss 4, the axial relative displacement of the boss 4 against the inner shell 2 can also be reliably prevented. For example, even if an impact force acts on the boss 4 from above in FIG. 22, the boss 4 is not pressed down off the neck portion 2a of the inner shell 2.

Figure 24:
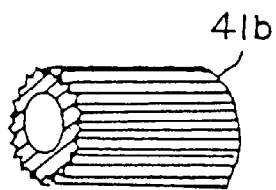
Figure 25:
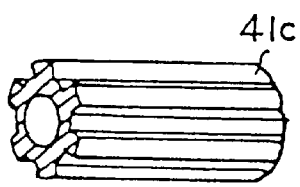

Even if the rugged configuration is as shown in FIG. 24 or 25, since the coupling area with the inner shell 2 is larger, the resistance against the external force in the thrust direction as mentioned above is also raised by that.

The rugged configuration 41 formed in this manner remarkably enhances the coupling strength of the boss 4 to the inner shell 2. The enhanced coupling strength, first of all, gives a large effect when the outer shell 3 is formed.

That is, if, for example, the inner shell 2 is made of a plastics material while the boss 4 is made of a metal, the pressure vessel of this embodiment can be produced by integrally joining the inner shell 2 to be molded and the boss 4 when the inner shell 2 is molded by blow molding. Since the rugged configuration 41 is formed on the circumferential surface of the boss 4, the inner shell 2 and the boss 4 integrally joined give a high coupling strength especially in the circumferential direction, and also a high coupling strength in the axial direction (i.e., in the direction in which the boss 4 receives a thrust force) between both of them.

In this state, the pressure resistant outer shell 3 is formed on the inner shell 2, to cover the inner shell 2. The outer shell 3 can be formed by a filament winding method or a tape winding method with the inner shell 2 as the core, i.e., mandrel. In this case, while the inner shell 2 is rotated, the reinforcing fiber yarns impregnated with a resin as described before are wound to form layers, and the boss 4 can be used as the rotary axis for rotating the inner shell 2. For example in a structure as shown in FIG. 1, the end boss portion 6 on the bottom side is set on a chuck and rotated, and on the boss 4 side, a jig is threadedly engaged with the threaded hole 4c for nozzle installation, to form a structure for supporting the rotating axis at both ends of the inner shell 2.

In this rotating action, at the coupling interface 15 between the boss 4 and the inner shell 2, a large torsional torque acts, and a thrust force acts in a direction to allow the boss 4 to fall off into the vessel.

However, in this embodiment since the rugged configuration 41 is formed as described before, the coupling strength at the coupling interface between the boss 4 and the inner shell 2 is remarkably enhanced in both the torsional torque direction and the thrust direction, and the loosening and falling-off (or displacement in the falling-off direction) from the inner shell can be reliably prevented.

Furthermore, the enhanced coupling strength exhibits its effect also after completion of the pressure vessel. Especially when an external force in the thrust direction acts, particularly when an impactive external force acts, the falling-off of the boss 4 from the inner shell 2 and the axial displacement of the boss 4 from the inner shell 2 can be effectively prevented.

Figure 28:
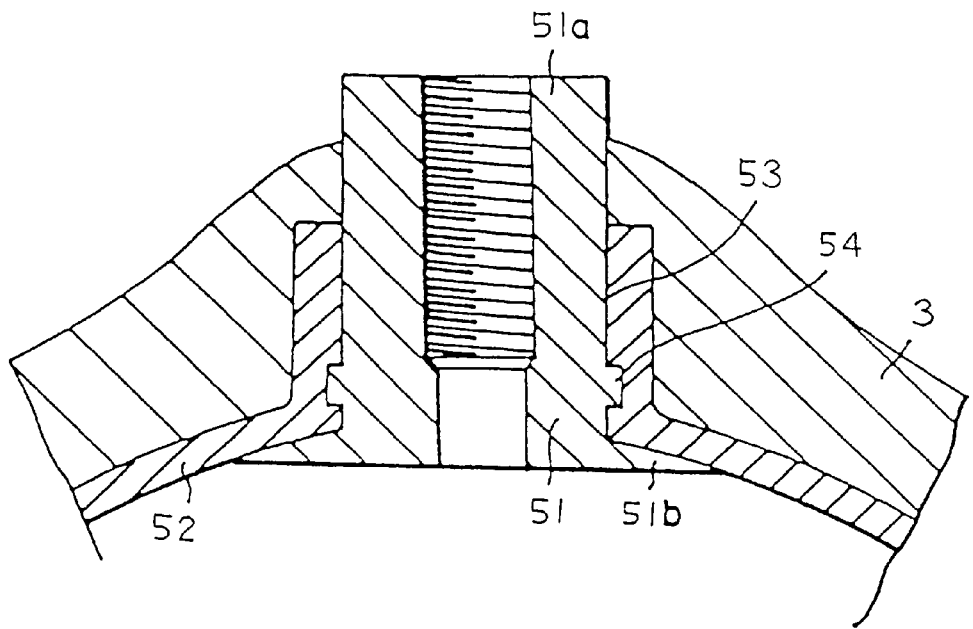

FIG. 28 shows a structure around the boss of the pressure vessel in a further other embodiment of the present invention.

In this embodiment, the boss 51 is composed of a cylindrical portion 51a and an engaging portion 51b spread like a trumpet at the bottom of the cylindrical portion 51a. The circumferential surface of the cylindrical portion 51a of the boss 51 has a ridge 54 formed to extend in the circumferential direction around the entire circumference in this embodiment at the coupling interface 53 with the inner shell 52. The ridge 54 is formed around the cylindrical portion 51a of the boss 51 in clear distinction from the flange-like engaging portion 51b formed at the bottom of the boss 51.

The ridge 54 considerably enhances the coupling strength between the boss 51 and the inner shell 52 especially against the axial thrust force acting on the boss 51. Therefore, against the thrust force acting when the outer shell 3 is formed, and against the impactive thrust force acting on the boss 51 after completion of the pressure vessel, the displacement and falling-off of the boss 51 in the direction to fall off from the vessel can be reliably prevented.

Since the ridge 54 formed increases the contact area between the boss 51 and the inner shell 52, the coupling strength also against the circumferential loosening of the boss 51 is enhanced.

Figure 29:
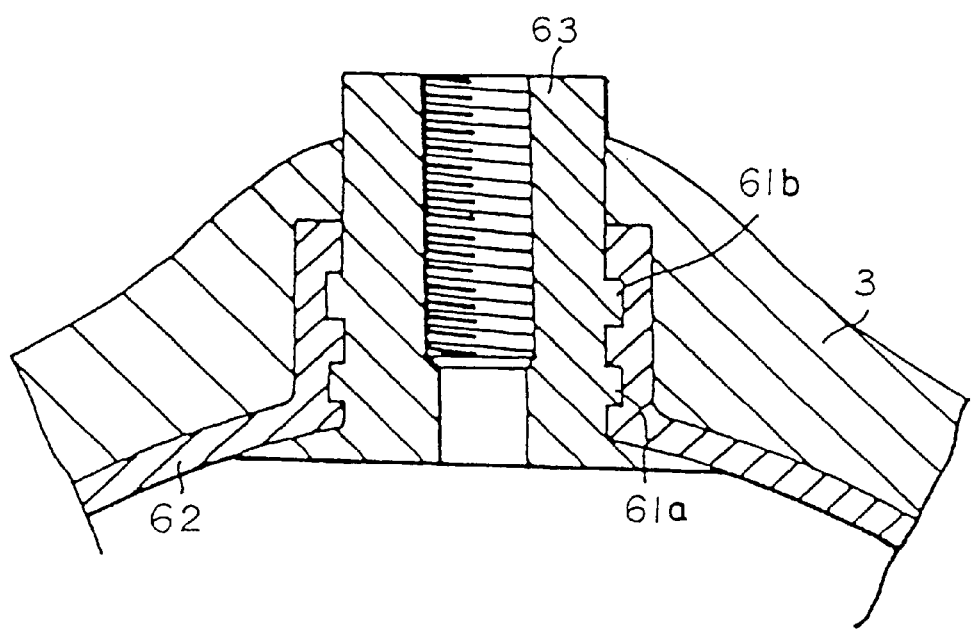

Two circumferential ridges can also be formed as shown in FIG. 29 (ridges 61a and 61b), and furthermore three or more ridges can also be formed. If the number of ridges is larger, the coupling strength between the inner shell 62 and the boss 63 tends to be higher.

The structures shown in FIGS. 22 and 28 can also be optionally applied in combination.

Figure 30:
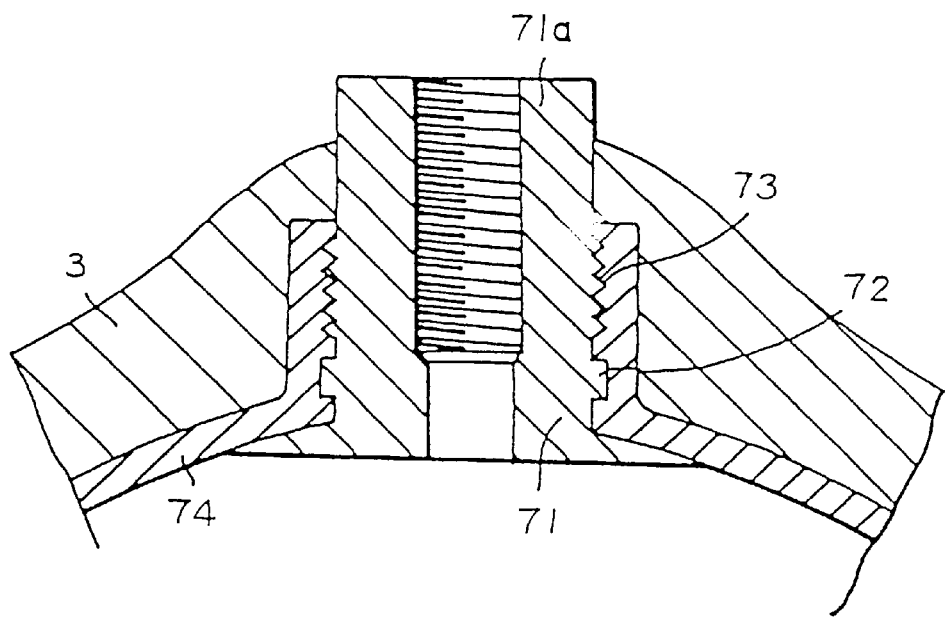

For example as shown in FIG. 30, a circumferential ridge 72 can be formed at a lower portion of the circumferential surface of the cylindrical portion 71a of the boss 71, and rugged configuration 73 (for example formed by knurling as shown in FIG. 23) can be formed on the circumferential surface of the cylindrical portion 71a above the ridge 72.

If the ridge 72 and the rugged configuration 73 are formed together, the ridge 72 gives resistance mainly against the thrust force, while the rugged configuration 73 gives resistance mainly against the circumferential displacement. So, both of them can exhibit very high strength against the displacement and loosening in the falling-off direction of the boss 71. That is, the coupling strength between the inner shell 74 and the boss 71 in every direction can be remarkably enhanced.

Furthermore, the structure of the boss having ruggedness and a ridge of the present invention can exhibit functions and effects other than those stated above, depending on the coupling structure between the inner shell and the boss.

Figure 31:
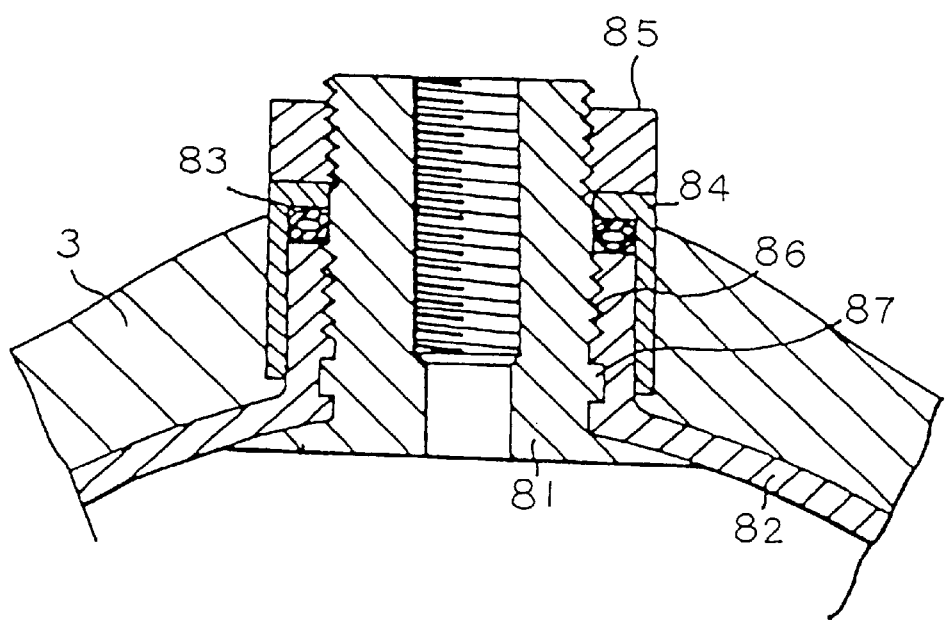

For example, in the structure shown in FIG. 31, a resiliently deformable seal ring 83 is arranged on the end face of the inner shell 82, to perfectly prevent gas leakage from the coupling interface between the boss 81 and the inner shell 82, and it is clamped by a clamp 85 (e.g., clamping nut) through a pressing member 84, to be kept in close contact with the circumferential surface of the boss 81 and the end face of the inner shell 82, to achieve perfect sealing at these regions.

In this structure, since the rugged configuration 86 and/or ridge 87 formed around the cylindrical portion of the boss 81 can remarkably enhance the coupling strength as described before, the loosening of the boss 81 due to the turning-together, etc. caused by the tightening of the clamp 85 can be reliably prevented.

Moreover in the structure shown in FIG. 31, to increase the fixing strength of the pressing member 84 or to further enhance the gas sealability, it is also possible to apply an adhesive between the inside surface of the pressing member 84 and the circumferential surface of the inner shell 82, and also on the respective seal faces to be kept in contact with the seal ring 83. The adhesive used can be selected from those previously listed.

Furthermore, if the pressure vessel of the present invention has a configuration such that a boss for nozzle installation is provided inside the neck portion of the inner shell, and such that a cylindrical member having a collar portion, cylindrical portion in succession to the collar portion, and a flange portion extending from the circumferential surface of the cylindrical portion into the outer shell is provided outside the neck portion, the gas sealability at the coupling portion between the inner shell and the boss for nozzle installation can be kept sufficiently high.

Figure 32:
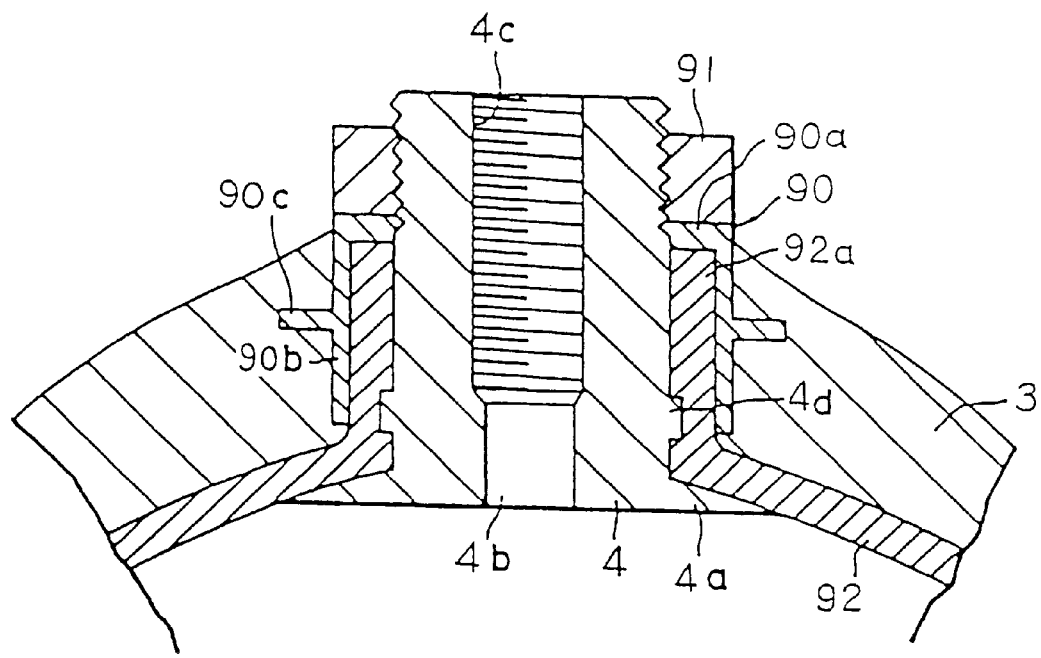

In this embodiment, as shown in FIG. 32, the boss 4 has an engaging portion 4a spread like a trumpet at the bottom in the axial direction, and the neck portion 92a of the inner shell 92 extends from the engaging portion 4a up to the circumferential portion of the boss 4. The inside surface of the region including the neck portion 92a of the inner shell 92 and the circumferential surface of the boss 4 are integrally coupled. If the boss 4 is made of, for example, a metal and the inner shell 92 is made of, for example, a plastics material, the boss 4 and the inner shell 92 can be integrally coupled when the inner shell 92 is molded by blow molding. Inside the boss 4, a thread 4c to be threadedly engaged with the nozzle is formed together with a gas passage 4b, and on the circumferential surface of the boss 4, an annularly extending ridge 4d is formed.

The material of the boss 4 is not especially limited, but since it is threadedly engaged with the nozzle 5, it is preferably made of a metal such as iron, aluminum, stainless steel or titanium.

Around the circumference of the boss 4 and outside the neck portion 92a of the inner shell 92, a cylindrical member 90 consisting of an inwardly and annularly extending collar portion 90a, a cylindrical portion 90b extending to cover the circumference of the neck portion 92a of the inner shell 92, and an annular flange portion extending from the circumferential surface of the cylindrical portion 90b into the outer shell 3 is provided. In this embodiment, the flange portion 90c extends perpendicularly from the circumferential surface of the cylindrical portion 90b, but it can be tilted a little either upwardly or downwardly in FIG. 32. The tip form of the flange portion 90c can be flat as illustrated, or sharp or roundish, etc. Furthermore, in this embodiment, the flange portion 90c extends continuously annularly over the entire circumference, but can be arranged intermittently in the circumferential direction, that is, a plurality of arcuate ridges like protrusions extending in the circumferential direction can be arranged.

Outside in the axial direction of the collar portion 90a of the cylindrical member 90, a clamp 91 (e.g., clamping nut) to be threadedly engaged with the circumferential surface of the boss 4 is provided. The tightening by the clamp 91 causes the collar portion 90a of the cylindrical member 90 to be held and fixed between the clamp 91 and the end face of the neck portion 92a of the inner shell. Therefore, the fixed collar portion 90a of the cylindrical member 90 is substantially engaged with the circumferential surface of the boss 6 through the clamp 91 threadedly engaged with the boss 4.

In production of the pressure vessel as described above, if, for example, the inner shell 92 is made of a plastics material and the boss 4 is made of a metal, then the pressure vessel can be produced by integrally joining the inner shell 92 to be molded and the boss 4 when the inner shell 92 is molded by blow molding, covering the neck portion 92a of the inner shell 92 with the cylindrical member 90, tightening the clamp 91 on it, to fix the cylindrical member 90 in a predetermined position, and forming the outer shell 3 with the inner shell 92 as the core, to cover the inner shell 92, by using the opening end portion 4 for nozzle installation and the end boss portion 6 at the bottom as the rotary axis. The outer shell 3 can be formed around the inner shell 92 by a filament winding method or a tape winding method. In this case, the outer shell 3 is formed to keep at least the flange portion 90c of the cylindrical member 90 buried in the outer shell 3.

In the pressure vessel configured as above, if a load such as an impactive force is applied from outside onto the boss 4, the load is received not only by the coupling interface between the boss 4 and the neck portion 92a of the inner shell, but also by the cylindrical member 90 through the clamp 91 threadedly engaged with the boss 4.

Because the flange portion 90c of the cylindrical member 90 is buried in the outer shell 3 and because the outer shell 3 is made of a pressure resistant material, the cylindrical member 90 and the outer shell 3 act in combination, to allow the cylindrical member 90 to receive a large component of the load. That is, the flange portion 90c acts like a prop. As a result, the load component acting on the boss 4 itself is greatly decreased, and the falling-off of the boss 4 from the neck portion 92a of the inner shell 92 into the vessel is reliably prevented. That is, as a result, the coupling strength between the boss 4 and the inner shell 92 is significantly enhanced.

Figure 33:
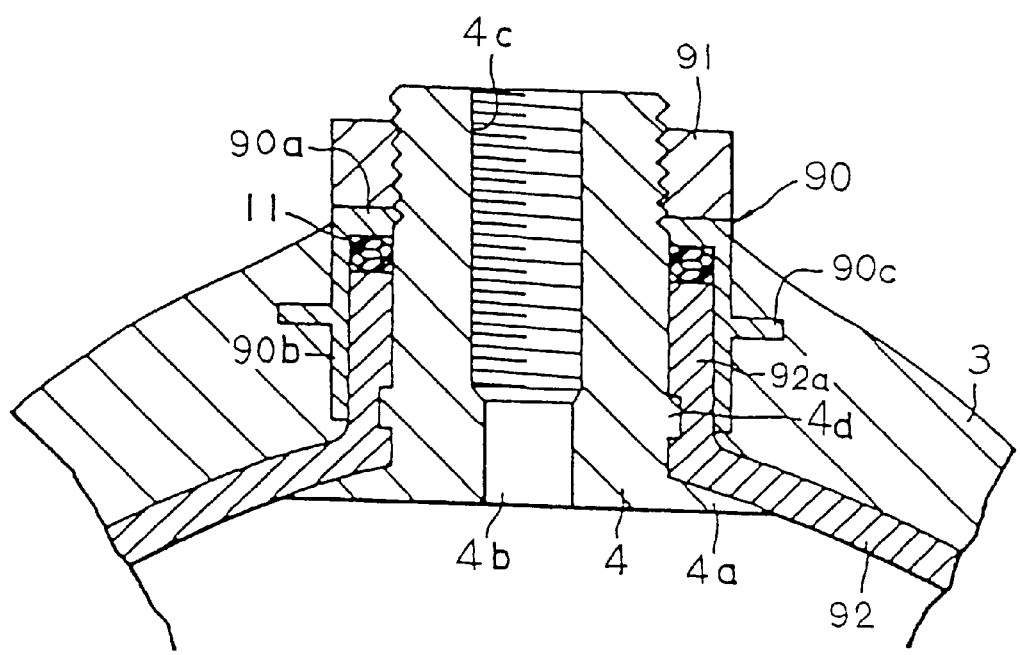

In the embodiment shown in FIG. 33, to enhance the gas sealability at the coupling interface between the boss 4 and the inner shell 92, said annular seal ring 11 capable of being resiliently deformed by pressing is fitted around the boss 4 on the end face of the neck portion 92a of the inner shell 92. Also in this configuration, since the flange portion 90c of the cylindrical member 90 is fixed and supported by the outer shell 3, a large component of an external load acting on the boss 4 is received by the cylindrical member 90 through the clamp 91. Therefore, the falling-off of the boss 4 is reliably prevented.

Figure 34:
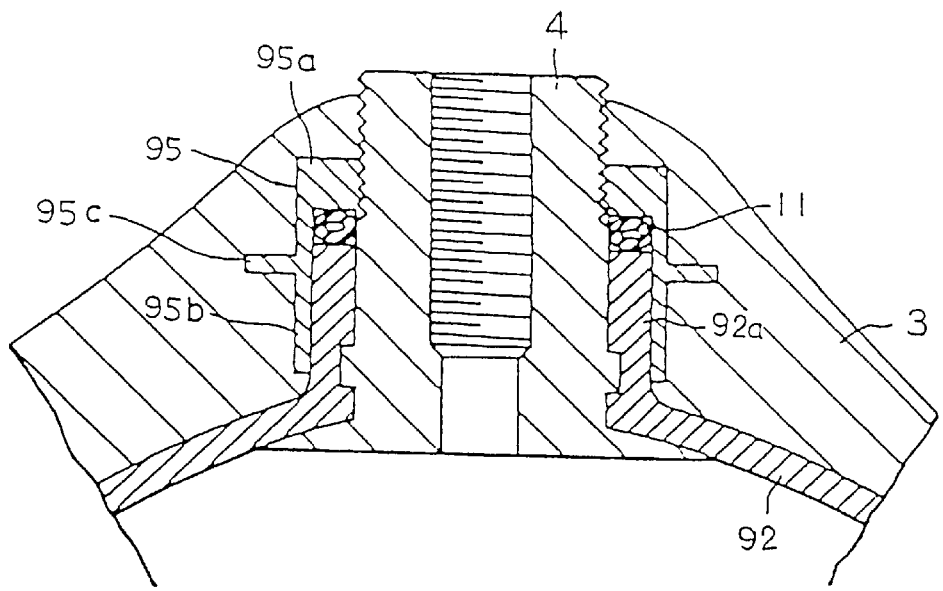

FIG. 34 shows a further embodiment. In this embodiment, the cylindrical member 95 consists of a collar portion 95a, a cylindrical portion 95b and a flange portion 95c, and the inside face of the collar portion 95a is directly threadedly engaged with the circumferential surface of the boss 4. Therefore, the clamp 91 shown in FIG. 33 is not provided. The other portions are the same as in FIG. 33. However, in this embodiment, it is preferable that the outer shell 3 is formed up to a region to cover the cylindrical member 95 as a whole.

Also in this configuration, since the flange portion 95c of the cylindrical member 95 is fixed and supported by the outer shell 95, most of an external load acting on the boss 4 is directly received by the cylindrical member 95, and the falling-off of the boss 4 is reliably prevented. Furthermore, to enhance the coupling strength between the inner shell and the cylindrical member, for further increasing the fixing strength of cylindrical member, an adhesive can be applied between the cylindrical member and the circumferential surface of the boss of the inner shell, and between the seal ring and the faces to receive the seal ring pressed, for enhancing the coupling strength. The adhesive can be selected from those previously listed.

On the other hand, if the pressure vessel of the present invention has a configuration such that the boss for nozzle installation is provided inside the neck portion of the inner shell, such that the outer diameter of the flange portion of the boss for nozzle installation is larger than the outer diameter of the cylindrical portion of the boss for nozzle installation by 20 mm to 25 mm, and such that the outer diameter of the cylindrical portion of the boss for nozzle installation is tapered on the surface to be kept in contact with the neck portion of the inner shell, then the gas sealability at the coupling interface between the inner shell and the boss for nozzle installation can be kept sufficiently high.

Figure 35:
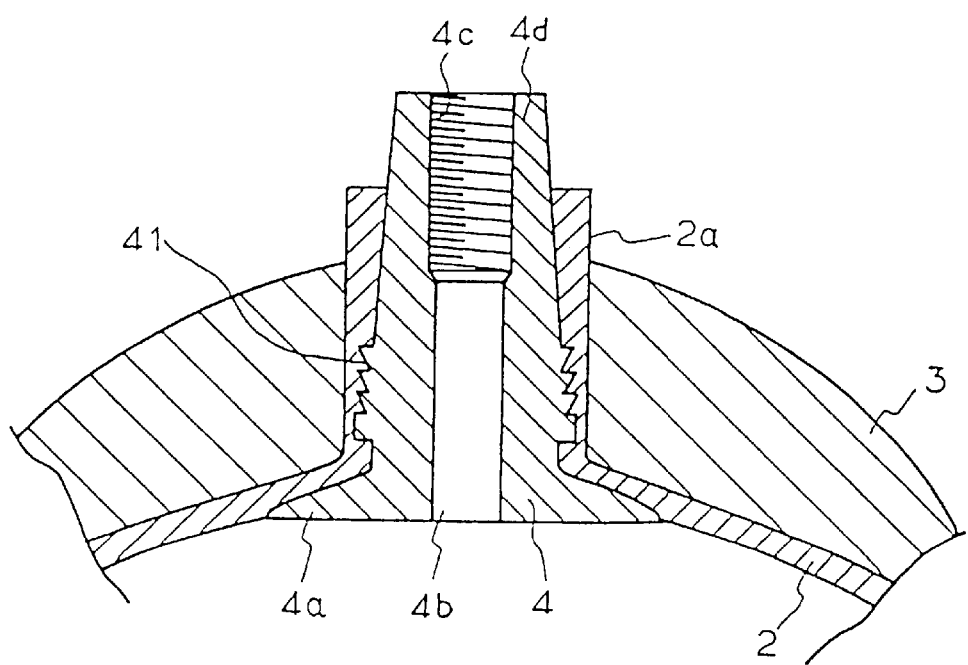

That is, if the cylindrical portion of the boss for nozzle installation is formed, for example, as shown in FIG. 35, the pressure acting on the inner shell acts to press the boss against the inner shell, to achieve strong close contact, for preventing the gas in the pressure vessel from leaking.

EXAMPLES

Example 1

A blow-molded inner shell (200 mm in outer diameter, 1,000 mm in the overall length excluding the nozzle installation portion, and 2 mm in wall thickness) made of high density polyethylene resin was used as a mandrel, to form an outer shell on an inner shell by a filament winding method. For the filament winding, a carbon fiber yarn (12,000 filaments of 7 $\mu$m in single fiber diameter, 4.6 GPa in tensile strength, and 2.2% in tensile breaking strain) impregnated with an epoxy resin (4% in tensile breaking strain) was wound to form a ±3° layer, 88° layer, and ±45° layer (the angles are with reference to the axial direction of the pressure vessel) in this order, with the volume ratio of the carbon fiber yarn in the ±3° layer: that in the 88° layer: that in the ±45° layer kept at 1:2:2, and the inner shell with the carbon fiber yarn wound around it was heated at 130° C. in an oven for 6 hours, to form the main body of the pressure vessel. The outer shell thus obtained was measured according to the NOL ring testing method. The tensile modulus was found to be 47 GPa, and the tensile breaking strain, 2.0%. The main body was 216 mm in outer diameter, and about 30 liters in capacity.

To measure the tensile modulus and the tensile breaking strain, samples obtained by cutting the cylindrical portion of the pressure vessel in round slices were measured according to the NOL ring testing method.

Then, a tap nose of 8 mm in the radius of curvature of the nose tip and 2 kg in weight was dropped at a speed of 2 m/sec onto the center of the main body at the same region 50 times using a drop impact tester. The damaged area (projected area in the perpendicular direction) observed by an ultrasonic flaw detector was 1.0 cm$^2$. Pressure tests using water as a pressure source were performed before and after the impact test. The ratio of the pressures withstood was 1.00, and no decline of the internal pressure which could be maintained, caused by the repetitive impacts, was observed.

Comparative Example 1

A main body was obtained as described in Example 1, except that the carbon fiber yarn used had 12,000 filaments of 7 $\mu$m in single fiber diameter, a tensile strength of 3.0 GPa and a tensile breaking strain of 1.3%. The outer shell was 51 GPa in tensile modulus and 1.2% in tensile breaking strain.

The main body was tested as described in Example 1, and the damaged area was 7.2 cm$^2$, and the ratio of pressures withstood before and after the impact test was 0.55.

Comparative Example 2

A main body of a pressure vessel was formed as described in Example 1, except that the carbon fiber yarn used had 12,000 filaments of 7 $\mu$m in single fiber diameter, a tensile strength 2.4 GPa, and tensile breaking strain of 1.6%, that an E glass fiber yarn of 9 $\mu$m in single fiber diameter, 3.5 GPa in tensile strength, and 4.8% in tensile breaking strain was used, and that ±3° layer of the carbon fiber yarn, an 88° layer of mixed carbon fiber yarn and E glass fiber yarn, and a ±45° layer of the carbon fiber yarn (the angles are with reference to the axial direction of the pressure vessel) were formed in this order, with the volume ratio of the fiber in the ±3° layer: that in the 88° layer: that in the ±45° layer maintained at carbon fiber yarn: {carbon fiber yarn: E glass fiber yarn}: carbon fiber yarn=1:{1:1}:2. The outer shell thus obtained was measured according to the NOL ring testing method, and found to be 30 GPa in tensile modulus, and 1.6% in tensile breaking strain.

The main body was tested as described in Example 1. The damaged area was 6.5 cm$^2$, and the ratio of pressures withstood before and after the impact test was 0.62.

Example 2

A dimethyl sulfoxide solution containing 20% of an acrylic copolymer consisting of 99.5 wt % of acrylonitrile and 0.5 wt % of itaconic acid (the polymer was 600 poises in the solution viscosity at 45° C.) was discharged through a nozzle plate once into a 3 mm air space, and introduced into a stationary coagulating bath at 5° C. containing 3% of dimethyl sulfoxide, to obtain coagulated fibers. In succession, they were washed by water, drawn in hot water, treated with an amino modified silicone oiling agent, dried, compacted, drawn in pressurised steam to a total ratio of 10 times, and wound to obtain a precursor of 12,000 filaments of 1.0 denier in single fiber thickness (with 1.55 wt % of oiling agent). Subsequently, it was treated to be flame retardant in air with a temperature profile of 230/260° C., and introduced into a carbonizing furnace at 1,300° C. in maximum temperature, being carbonized in nitrogen gas atmosphere at a heating rate of about 300° C./min in a temperature range from 300 to 700° C. and at a heating rate of about 400° C./min in a temperature range from 1,000 to 1,200° C., to obtain a carbon fiber yarn. The above flame retardation treatment and carbonization treatment were carried out in an atmosphere filtered to remove dust. It was electrolytically treated in an electrolyzer containing 0.05 mole/liter aqueous sulfuric acid solution as the electrolyte at 5 coulombs/gram (1.25 coulombs/g.cell) for 1 minute, washed with water, and dried at 150° C., to obtain a carbon fiber yarn with 12,000 filaments of 7 μm in single fiber diameter, of 5.8 GPa in tensile strength, 245 GPa in tensile modulus, 1.80 in specific gravity, 0.18 in oxygen ratio at surface O/C, and 0.04 in nitrogen ratio at surface N/C. The yarn was impregnated with an epoxy resin (bisphenol F type epoxy resin with an acid anhydride based hardening agent and a 2E4MZ based promoter) by feeding it through a resin tank and along roller guides, and it was wound by a filament winding method around a blow-molded inner shell (300 mm in outer diameter, 500 mm in the overall length excluding the nozzle installing portion, and 5 mm in wall thickness) made of high density polyethylene resin, using the inner shell as a mandrel, with the ratio of the quantity of fibers in the axial direction of the outer shell: the quantity of fibers in the circumferential direction (accurately θ=±3° and 90°) kept at 1:2, and heated in an oven at 130° C. for 6 hours, to form a main body of a pressure vessel. The outer shell thus obtained was measured by the NOL ring testing method, and found to be 80 GPa in tensile modulus, and 2.3% in tensile breaking strain. The main body was 310 mm in outer diameter and 9 kg in weight respectively.

Then, a tap nose of 8 mm in the radius of curvature of the nose tip and 2 kg in weight was dropped at a speed of 2 m/sec onto the center of the main body at the same region 50 times using a drop impact tester. The damaged area (projected area in the perpendicular direction) observed by an ultrasonic flaw detector was 1.0 cm². Pressure tests using water as a pressure source were performed before and after the impact test. The ratio of the pressures withstood was 1.00, and no decline in the internal pressure which could be maintained caused by the repetitive impacts was observed.

Example 3

A pressure vessel configured as shown in FIGS. 1 and 14 was manufactured as described in Example 1. The pressure vessel was charged with helium gas up to an internal pressure of 20 MPa, and placed in a sealed container for 1 hour. The quantity of the helium gas in the sealed container was measured by gas chromatography, and found to be 0. That is, the gas leakage from the pressure vessel was 0.

Example 4

A pressure vessel configured as shown in FIGS. 1 and 32 was manufactured as described in Example 1. The cylindrical member 90 having the flange portion 90*c* was used. A static external load was applied to the boss 4 in the axial direction, and it was gradually increased. The pressure vessel could withstand a load of up to 1 ton.

Example 5

A blow-molded inner shell (100 mm in outer diameter, 300 mm in the overall length excluding the nozzle installing portion, 1 mm in wall thickness) made of high density polyethylene resin was used as a mandrel for forming an outer shell by a filament winding method. For the filament winding, a carbon fiber yarn (12,000 filaments of 7 μm in single fiber diameter, 5.0 GPa in tensile strength, 2.2% in tensile breaking strain) was wound to form a ±30° layer and an 88° layer (the angles are with reference to the axial direction of the pressure vessel) in this order, with the volume ratio of the carbon fiber yarn in the ±30° layer: that in the 88° layer kept at 1:1.5, and the inner shell with the layers formed was heated in an oven at 130° C. for 6 hours, to form a main body of a pressure vessel. The outer shell thus obtained was 73 GPa in tensile modulus and 2.0% in tensile breaking strain, and the outer diameter of the main body was 104 mm. To measure the tensile modulus and the tensile breaking strain, samples obtained by cutting the body portion of the pressure vessel in round slices were measured according to the NOL ring testing method.

The main body was loaded with a hydraulic pressure of 30 MPa using a hydraulic tester, and then a drop impact tester was used to let a tap nose of 3 mm in the radius of curvature of the nose tip and 20 kg in weight drop at a speed of 7 m/sec onto the main body. A hole was formed only at the portion where the nose tip hit, and the pressure vessel as a whole was not destroyed.

Industrial Applicability

The pressure vessel of the present invention can be used for various applications, but it is especially suitable as a CNG tank for a motor vehicle which is required to be light in weight and excellent in reliability.

What is claimed is:

1. A process for producing a pressure vessel characterised in forming, by a filament winding method or a tape winding method, a pressure resistant outer shell, around an inner shell capable of serving as a gas barrier, said outer shell is made of an CFRP comprising reinforcing carbon fibers having a strand tensile breaking strain of 2.0% or more and a resin and is 35 GPa or more in tensile modulus and 1.5% or more in tensile breaking strain, wherein the outer shell comprises a first layer of reinforcing fibers arranged, with reference to the axial direction of the pressure vessel, at an angle within a range from 10 degrees to ±15 degrees, a second layer of reinforcing fibers arranged at an angle within a range from ±85 degrees to ±100 degrees and a third layer of reinforcing fibers arranged at an angle within a range from ±40 degrees to ±60 degrees and wherein the volume ratio of reinforcing fibers in the first layer of reinforcing fibers arranged at an angle within a range from ±0 degrees to ±15 degrees to that in the second layer in the reinforcing fibers arranged at an angle within a range from ±85 degrees to ±100 degrees to that in the third layer of reinforcing fibers arranged at an angle within a range from ±40 degrees to ±60 degrees, with reference to the axial direction of the pressure vessel, is within a range of 1:1.5:0.2 to 1:2.5:1.2.

2. A process for producing a pressure vessel of claim 1 characterised in that an outside surface of the inner shell is roughened, prior to the filament winding method or the tape winding method.

3. A process for producing a pressure vessel of claim 1 characterised in forming a pressure resistant outer shell having a tensile modulus of 35 GPa or more and a tensile breaking strain of 1.7% or more.

4. A process for producing a pressure vessel of claim 1 characterised in forming the pressure resistant outer shell having a tensile modulus of 35 GPa or more and a tensile breaking strain of 2.0% or more.

5. A process for producing a pressure vessel of claim 1 characterised in using as the reinforcing fibers carbon fiber yarns of 4.5 GPa or more in strand tensile strength.

6. A process for producing a pressure vessel of claim 1 characterised in using as the reinforcing fibers carbon fiber yarns of 5.5 GPa or more in strand tensile strength and 2.0% or more in strand tensile breaking strain.

7. A process for producing a pressure vessel of claim 1 characterised in that the outer shell is formed to have a layer structure of 5 or more layers around a body portion of the inner shell, and a relation between a total thickness T (mm) of all the layers and a number N of the layers satisfies $0.5 \leq T/N \leq 6$.

8. A process for producing a pressure vessel of claim 7 characterised in that layers with reinforcing fibers hoop-wound and layers with reinforcing fiber helically wound are alternately arranged in a thickness direction of the outer shell.

9. A process for producing a pressure vessel of claim 7 characterised in that a non-twisted reinforcing fiber bundle having a ratio D/t of 5 or more is used as the reinforcing fibers, where D is a width of the bundle not yet impregnated with any resin and t is a thickness of the bundle.

10. A process for producing a pressure vessel of claim 1 characterised in that the pressure resistant outer shell is formed by using a yarn prepreg which comprises the following components [X], [Y] and [Z], which component [X] is impregnated with the component [Y], and which component [Z] is present near the surfaces:

[X]: a reinforcing fiber bundle

[Y]: a thermosetting resin

[Z]: an elastomer and/or thermoplastic resin.

11. A process for producing a pressure vessel of claim 10 characterised in that the yarn prepreg used has particles of the component [Z] deposited on the surfaces of the component [X] impregnated with the component [Y].

12. A process for producing a pressure vessel of claim 1, which comprises providing a reinforcing layer of reinforcing fibers having a hoop-wound layer of reinforcing fibers and a resin, on a circumferential surface of a shoulder portion of the inner shell which has a body portion and a shoulder portion, and forming the pressure resistant outer shell around the reinforcing layer and the inner shell.

13. A process for producing a pressure vessel of claim 12 characterised in that the reinforcing layer is formed by the filament winding method.

14. A process for producing a pressure vessel of claim 12 characterised in that the reinforcing layer is formed by the filament winding method as an extended layer of the innermost layer of the outer shell formed on the circumferential surface of the body portion of the inner shell.

* * * * *